(12) United States Patent
Xie et al.

(10) Patent No.: US 8,941,052 B2
(45) Date of Patent: Jan. 27, 2015

(54) ILLUMINATION PORTION FOR AN ADAPTABLE RESOLUTION OPTICAL ENCODER

(71) Applicant: Mitutoyo Corporation, Kawasaki-shi, Kanagawa-ken (JP)

(72) Inventors: Yong Xie, Redmond, WA (US); Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 263 days.

(21) Appl. No.: 13/730,790

(22) Filed: Dec. 28, 2012

(65) Prior Publication Data
US 2013/0161500 A1 Jun. 27, 2013

Related U.S. Application Data

(63) Continuation-in-part of application No. 13/717,586, filed on Dec. 17, 2012.

(60) Provisional application No. 61/580,133, filed on Dec. 23, 2011.

(51) Int. Cl.
*F21V 5/04* (2006.01)
*F21V 9/14* (2006.01)
*G01D 5/347* (2006.01)

(52) U.S. Cl.
CPC ... *F21V 5/04* (2013.01); *F21V 9/14* (2013.01); *G01D 5/34715* (2013.01)
USPC .................................. 250/231.13; 250/237 G

(58) Field of Classification Search
USPC ............ 250/231.13, 231.14, 231.15, 231.16, 250/231.17, 231.18, 231.19, 237 G; 341/11, 341/13
See application file for complete search history.

(56) References Cited

U.S. PATENT DOCUMENTS

| 3,796,498 A | 3/1974 | Post |
| 3,882,482 A | 5/1975 | Green |

(Continued)

FOREIGN PATENT DOCUMENTS

EP 0 446 691 B1 9/1991

OTHER PUBLICATIONS

Gustafsson, M.G.L., "Nonlinear Structured-Illumination Microscopy: Wide-Field Fluorescence Imaging With Theoretically Unlimited Resolution," Proceedings of the National Academy of Sciences (PNAS) 102(37):13081-13086, Sep. 13, 2005.

(Continued)

*Primary Examiner* — Tony Ko
(74) *Attorney, Agent, or Firm* — Christensen O'Connor Johnson Kindness PLLC

(57) ABSTRACT

An illumination portion is used in an optical encoder which comprises a scale grating, an imaging portion, and a detector portion. A light source outputs light having a wavelength λ. A structured illumination generating portion inputs the light and outputs structured illumination. The structured illumination comprises an illumination fringe pattern oriented transversely to the measuring axis direction. A first filtering lens focuses the structured illumination proximate to a plane of the spatial filter aperture configuration. A spatial filtering aperture configuration includes a central portion that blocks zero-order portions of the structured illumination and an open aperture portion that outputs +1 order and −1 order portions of the structured illumination to a second filtering lens. The second filtering lens outputs the structured illumination to a plane of the scale grating with an illumination fringe pitch $P_{MI}$ along the measuring axis direction at a plane coinciding with the scale grating.

8 Claims, 16 Drawing Sheets

(56) References Cited

U.S. PATENT DOCUMENTS

| | | |
|---|---|---|
| 4,049,965 A | 9/1977 | Pettigrew |
| 4,051,367 A | 9/1977 | Sayce |
| 4,079,252 A | 3/1978 | Brake |
| 4,109,389 A | 8/1978 | Balcom |
| 4,176,276 A | 11/1979 | Kaul |
| 4,200,395 A | 4/1980 | Smith |
| 4,414,754 A | 11/1983 | Lapeyre |
| 4,823,001 A | 4/1989 | Kobayashi |
| 4,959,542 A | 9/1990 | Stephens |
| 4,964,727 A | 10/1990 | Huggins |
| 5,009,506 A | 4/1991 | Spies |
| 5,010,655 A | 4/1991 | Rieder |
| 5,237,391 A | 8/1993 | Huggins |
| 5,279,044 A | 1/1994 | Bremer |
| 5,430,546 A | 7/1995 | Huber |
| 5,442,166 A | 8/1995 | Hollman |
| 5,481,106 A | 1/1996 | Nyui |
| 5,773,820 A | 6/1998 | Osajda |
| 5,886,519 A | 3/1999 | Masreliez |
| 5,956,140 A | 9/1999 | Ishizuka |
| 5,965,879 A | 10/1999 | Leviton |
| 6,188,058 B1 | 2/2001 | Tullis |
| 6,329,909 B1 | 12/2001 | Siedentop |
| 6,628,390 B1 * | 9/2003 | Johnson .................. 356/400 |
| 7,186,969 B2 | 3/2007 | Shimomura |
| 7,307,789 B2 | 12/2007 | Mizutani |
| 7,435,945 B2 | 10/2008 | Shimomura |
| 7,551,221 B2 | 6/2009 | Sasaki |
| 7,608,813 B1 | 10/2009 | Milvich |
| 7,618,250 B2 | 11/2009 | Van Santen |
| 8,492,703 B2 * | 7/2013 | Tobiason et al. ......... 250/231.13 |
| 8,658,964 B2 * | 2/2014 | Kaneko et al. ........... 250/231.13 |
| 2009/0279100 A1 | 11/2009 | McMurtry |
| 2011/0031383 A1 | 2/2011 | Tobiason |

OTHER PUBLICATIONS

Tobiason, J.D., and E.H. Altendorf, "Adaptable Resolution Optical Encoder," U.S. Appl. No. 13/717,586, filed Dec. 17, 2012.

* cited by examiner

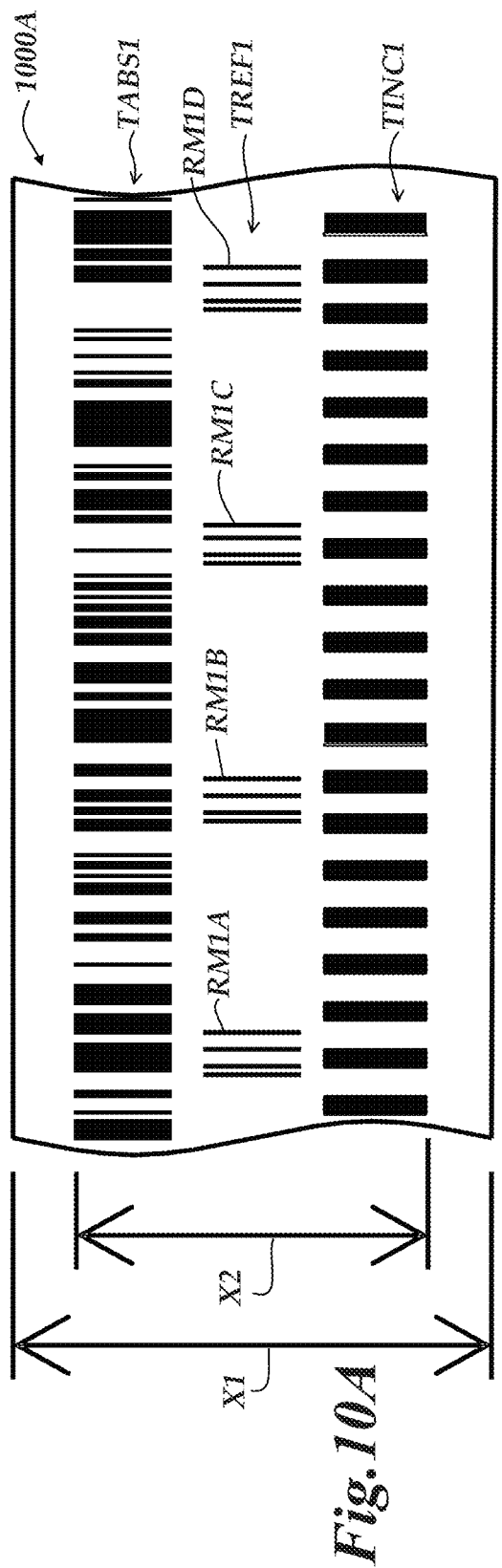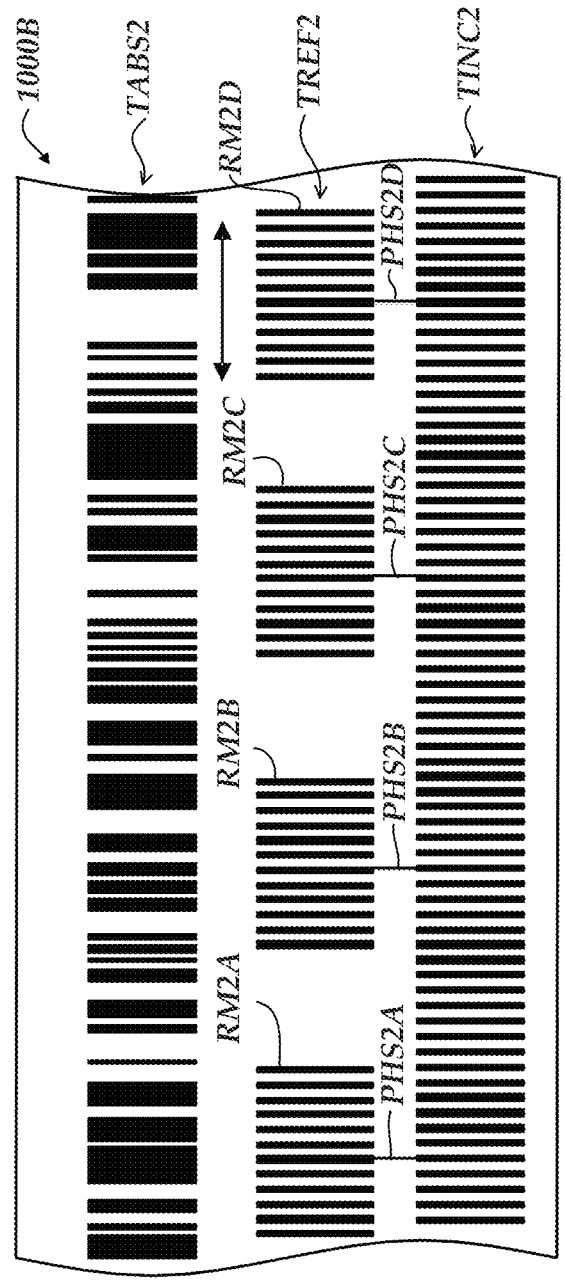
Fig. 10A
Fig. 10B

| # | Track | Phase Grating | Scale | Moire Pattern Pitch | Interp Factor K | Det. | Synthetic Wavel. | L | # INC and Ref det elements (per image array) | # INC cycles between barkers |
|---|---|---|---|---|---|---|---|---|---|---|
| 1 | TINC2 | S=5 | p=4 | 20 | 40 | d=15 | 164 um | 136 um (33 lines period p') | ~8 (x4 imaged marks) (120 and 136 um each) | 150 |
|  | TREF2 | 5 | p'=4.1 | 22.77 | 40 | d'=17 | 164 um | 136 um (33 lines period p') | ~8 (x4 imaged marks) (120 and 136 um each) | 150 |
| 2 | TINC2 |  | 10 | 8 | 40 | 27.6 | d=10 | 221.3 | 195 um (~23 lines) | ~16 (x4 imaged marks) (195.2 um length) | 75 |
|  | TREF2 |  | 10 | 8.3 | 48.8 | 27.6 | d'=12.2 | 221.3 | 195 um (~23 lines) | ~16 (x4 imaged marks) (195.2 um length) | 75 |

ILLUMINATION PORTION FOR AN ADAPTABLE RESOLUTION OPTICAL ENCODER

CROSS-REFERENCE TO RELATED APPLICATIONS

This application is a continuation-in-part of U.S. patent application Ser. No. 13/717,586, filed Dec. 17, 2012, which claims the benefit of U.S. Provisional Application No. 61/580,133, filed Dec. 23, 2011, the disclosures of which are incorporated by reference herein in their entirety.

FIELD

The present application relates generally to precision measurement instruments and more particularly to optical displacement encoders.

BACKGROUND

Various optical displacement encoders are known that use a readhead having an optical arrangement that images a scale pattern to a photodetector arrangement in the readhead. The image of the scale pattern displaces in tandem with the scale member, and the movement or position of the displaced scale pattern image is detected with a photodetector arrangement. Conventional imaging, self-imaging (also called Talbot imaging), and/or shadow imaging may be used to provide the scale pattern image in various configurations.

Optical encoders may utilize incremental or absolute position scale structures. An incremental position scale structure allows the displacement of a readhead relative to a scale to be determined by accumulating incremental units of displacement, starting from an initial point along the scale. Such encoders are suitable for certain applications, particularly those where line power is available. However, in low power consumption applications (e.g., battery powered gauges and the like), it is more desirable to use absolute position scale structures. Absolute position scale structures provide a unique output signal, or combination of signals, at each position along a scale. They do not require continuous accumulation of incremental displacements in order to identify a position. Thus, absolute position scale structures allow various power conservation schemes. A variety of absolute position encoders are known, using various optical, capacitive or inductive sensing technologies. U.S. Pat. Nos. 3,882,482; 5,965,879; 5,279,044; 5,886,519; 5,237,391; 5,442,166; 4,964,727; 4,414,754; 4,109,389; 5,773,820; and 5,010,655 disclose various encoder configurations and/or signal processing techniques relevant to absolute position encoders, and are hereby incorporated herein by reference in their entirety.

One type of configuration that is utilized in some optical encoders is a telecentric arrangement. U.S. Pat. Nos. 7,186, 969; 7,307,789; and 7,435,945, each of which is hereby incorporated herein by reference in its entirety, disclose various encoder configurations that utilize either singly or doubly telecentric imaging systems for imaging the periodic pattern of light and sensing displacement of the periodic scale structure. Telecentric imaging systems provide certain desirable features in such optical encoders.

One issue with regard to the design of such optical encoders is that users generally prefer that the readheads and scales of the encoders be as compact as possible. A compact encoder is more convenient to install in a variety of applications. For certain precision measurement applications, high resolution is also required. However, the prior art fails to teach configurations which provide certain combinations of high resolution, range-to-resolution ratio, robustness, compact size, and design features which allow a number of encoder resolutions to be provided using shared manufacturing techniques and components, and which facilitate low cost as desired by users of encoders. Improved configurations of encoders that provide such combinations would be desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The principles disclosed herein are directed to improved optical displacement encoder configurations that provide improved combinations of high resolution, range-to-resolution ratio, compact size, robustness, and which allow a number of encoder resolutions to be provided using shared manufacturing techniques and components.

The disclosure of U.S. patent application Ser. No. 13/717, 586 included the use of a phase grating in an illumination portion to substantially block zero-order light from reaching an encoder scale grating in order to diminish related errors in the encoder displacement signals, and other encoder configurations have utilized a blocking portion in an aperture of an imaging configuration to substantially block unwanted zero-order light from reaching the detector. However, the inventor(s) have determined that these methods still allow residual zero-order light (e.g., on the order of a few percent of the signal light, or less) to produce unwanted periodic errors in the spatially modulated image light provided at the detector portion. Therefore, further improvements in diminishing zero-order light propagation remain desirable in certain encoder configurations.

In various embodiments disclosed herein, an illumination portion is used in an optical encoder which comprises a scale grating, an imaging portion, and a detector portion. The illumination portion comprises: a light source that outputs light having a wavelength λ; a structured illumination-generating portion that inputs the light and outputs structured illumination where the structured illumination comprises an illumination fringe pattern oriented transversely to the measuring axis direction; a first filtering lens; a spatial filtering aperture configuration; and a second filtering lens. The first filtering lens focuses the structured illumination proximate to a plane of the spatial filter aperture configuration; the spatial filtering aperture configuration includes a central portion that blocks zero-order portions of the structured illumination and an open aperture portion proximate to the central portion that outputs +1 order and −1 order portions of the structured illumination to the second filtering lens; and the second filtering lens outputs the structured illumination to a plane of the scale grating as filtered structured illumination with an illumination fringe pitch $P_{MI}$ along the measuring axis direction at a plane coinciding with the scale grating.

In some embodiments, the structured illumination-generating portion may comprise a source grating positioned between the light source and the first filtering lens and configured to output diffracted light to the first filtering lens. In some embodiments, the illumination portion may further comprise a lens positioned between the light source and the first filtering lens which collimates the light output by the light source. In some embodiments, the illumination portion may further comprise a first filtering lens, a spatial filtering aperture configuration and a second filtering lens, wherein: the first filtering lens focuses the structured illumination proximate to a plane of the a spatial filter aperture configuration; the spatial filtering aperture configuration includes a central portion that blocks zero-order portions of the structured illumination and an open aperture portion that outputs +1 order and −1 order portions of the structured illumination to the second filtering lens; and the second filtering lens outputs the structured illumination to a plane of the scale grating. In some embodiments, the linear polarizer may input coherent, collimated light from the light source and outputs light which is linearly polarized; the polarizing beam splitter may reflect spatially filtered structured illumination from the second filtering lens to the quarter wave plate; the quarter wave plate may circularly polarize the light from the second filtering lens and outputs it to the scale pattern; the scale pattern may reflect spatially modulated image light with a circular polarization; the quarter wave plate may input the spatially modulated image light with a circular polarization and outputs linearly polarized spatially modulated image light with a linear polarization to the polarizing beam splitter; and the polarizing beam splitter may transmit the spatially modulated image light with a linear polarization to the imaging portion. In some embodiments, the illumination portion may further comprise a source grating positioned between the light source and the first filtering lens and configured to output diffracted light to the first filtering lens. In some embodiments, the source grating may be an amplitude grating.

It will be appreciated that while the methods are primarily described herein in terms of imaging and spatial filtering, such concepts may also be described in terms of the light ray components of the optical system, including diffracted rays, etc.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 10A and 10B are diagrams of the scale track pattern arrangements of the encoder configurations of FIGS. 1 and 3, respectively;

FIG. 11 is a table illustrating parameters for various scale and detector track combinations for the encoder configuration of FIG. 3;

DETAILED DESCRIPTION

Figure 1:
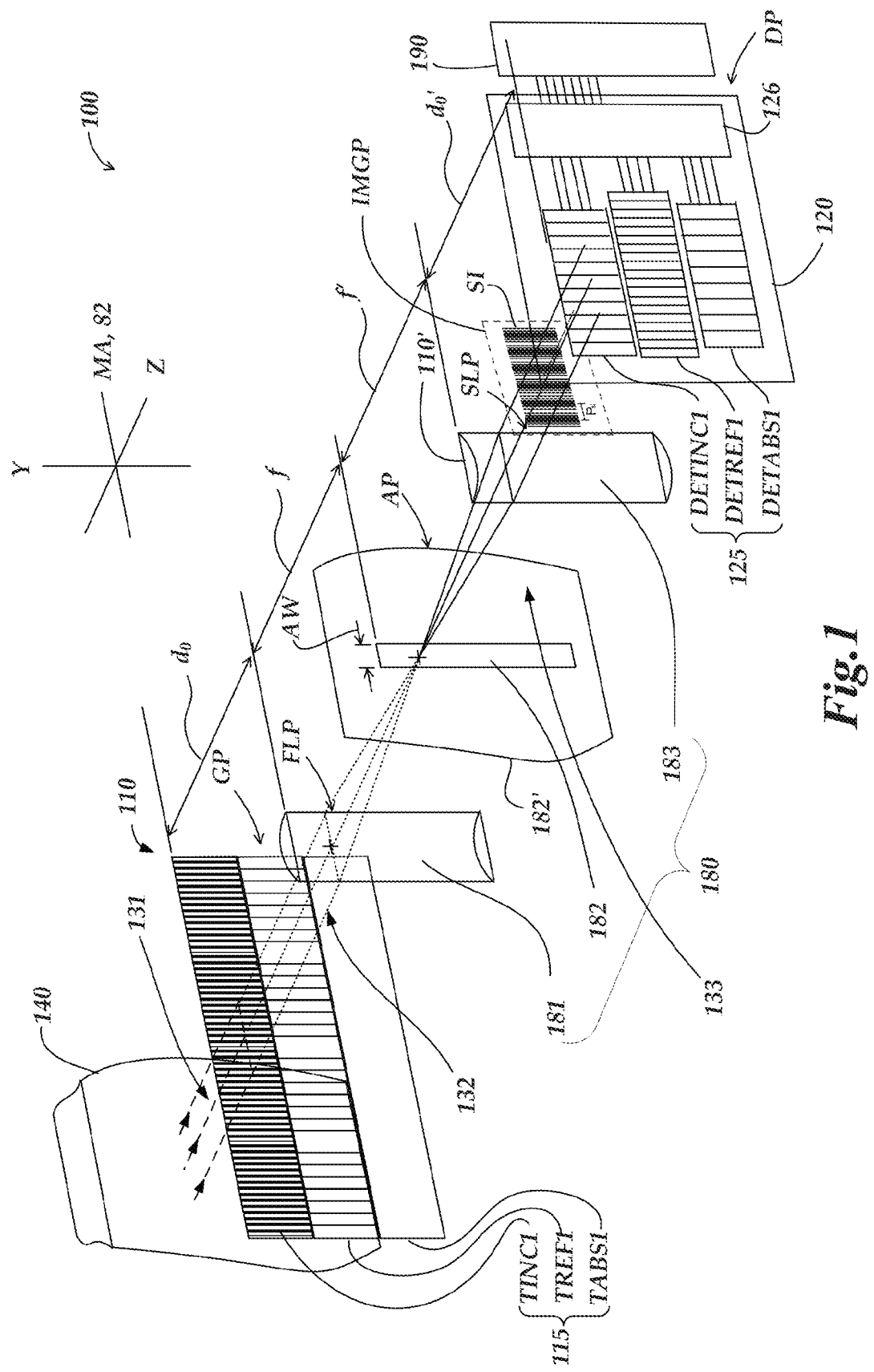
FIG. 1 is a partially schematic exploded diagram of an encoder configuration with a doubly telecentric arrangement and a scale with absolute, reference, and incremental track patterns, and utilizing conventional imaging techniques.

FIG. 1 is a partially schematic exploded diagram of an optical displacement encoder configuration 100 with a doubly telecentric arrangement and a scale with absolute, reference, and incremental track patterns and utilizing conventional imaging techniques. Certain aspects of the encoder configuration 100 are similar to encoder configurations described in copending and commonly assigned U.S. patent application Ser. No. 12/535,561 and U.S. patent application Ser. No. 12/273,400, filed Nov. 18, 2008 (hereinafter the '400 Application), which are hereby incorporated by reference in their entireties. While the encoder configuration 100 is able to operate accurately and effectively with an incremental scale track with a relatively coarse pitch (e.g., 20 microns), as will be described in more detail below with reference to FIG. 3, the methods disclosed herein may be utilized to allow an incremental scale track with a much finer pitch (e.g., 4 microns) to be utilized in a similar configuration.

As shown in FIG. 1, the encoder configuration 100 includes a scale element 110, a lens 140 for directing visible or invisible wavelengths of light from a light source (not shown), and a doubly telecentric imaging configuration 180. The doubly telecentric imaging configuration 180 comprises a first lens 181 at a first lens plane FLP, an aperture 182 in an aperture component 182' at an aperture plane AP, a second lens 183 at a second lens plane SLP, and detector electronics 120 at a detector plane DP. In at least one embodiment, the scale element 110 is separated from the first lens plane FLP by a distance $d_0$, the first lens plane FLP is separated from the aperture plane AP by a focal distance f, the aperture plane AP is separated from the second lens plane SLP by a focal distance f', and the second lens plane SLP is separated from the detector plane DP by a distance $d_0'$. The detector electronics 120 may be connected to signal generating and processing circuitry 190. The light source may also be connected to the signal generating and processing circuitry 190 by power and signal connections (not shown).

In the embodiment shown in FIG. 1, the scale element 110 includes a scale pattern 115 that comprises three scale track patterns: an absolute scale track pattern TABS1, a reference scale track pattern TREF1, and an incremental scale track pattern TINC1. The track pattern TABS1 is referred to as an absolute scale track pattern because it provides signals usable to determine an absolute position over an absolute measuring range. In at least one embodiment, any conventional absolute scale pattern may be utilized for the absolute scale track pattern TABS1. In at least one embodiment, the absolute scale track pattern TABS1 may have a very "coarse" ABS resolution, on the order of the detector dimension along the X-axis.

For the incremental scale track pattern TINC1, in at least one embodiment the incremental pitch may be relatively coarse (e.g., 20 microns.) As will be described in more detail below with respect to FIG. 3, a finer pitch (e.g., 4 microns) may be made to be operable in a similarly sized encoder configuration by utilizing the methods disclosed herein. The reference scale track pattern TREF1 is formed so that it can be resolved to a level that allows it to indicate a particular incremental wavelength, so that the incremental wavelength (e.g., from the incremental scale track pattern TINC1) is not ambiguous relative to an absolute mark (e.g., from the absolute scale track pattern TABS1). As will be described in more detail below with respect to FIG. 10A, in at least one embodiment, the reference scale track pattern TREF1 may comprise a series of reference marks. In at least one embodiment, the reference marks may be formed as a series of barker patterns, which may also function as Vernier reference marks, and which may be formed according to a variety of known techniques.

FIG. 1 shows orthogonal X, Y, and Z directions, according to a convention used herein. The X and Y directions are parallel to the plane of the scale pattern 115, with the X direction parallel to the intended measuring axis direction MA 82 (e.g., perpendicular to elongated pattern elements that may be included in the incremental scale track pattern TINC1). The Z direction is normal to the plane of the scale pattern 115.

The detector electronics 120 include a detector configuration 125 comprising three detector tracks DETABS1, DETREF1. and DETINC1, which are arranged to receive light from the three scale track patterns TABS1, TREF1, and TINC1, respectively. The detector electronics 120 may also include signal processing circuitry 126 (e.g. signal offset and/or gain adjustments, signal amplifying and combining circuits, etc.). In at least one embodiment, the detector electronics 120 may be fabricated as a single CMOS IC.

In operation, as exemplified by the image channel for the incremental scale track pattern TINC1, the light from the illumination source is directed by the lens 140 to illuminate the incremental scale track pattern TINC1 with source light 131. In some embodiments, the source light 131 is coherent light. The incremental scale track pattern TINC1 then outputs scale light 132. It will be appreciated that the limiting aperture 182, which has an aperture width AW along the X direction, acts as a spatial filter (as will be described in more detail below with respect to FIG. 2) to select or limit the light rays that pass through the image channel for the incremental scale track pattern TINC1. FIG. 1 illustrates three such light rays, two extreme rays and one central ray. As shown in FIG. 1, the lens 181 transmits the light rays towards the limiting aperture 182. The limiting aperture 182 transmits the rays as spatially filtered image light 133 to the second lens 183, and the second lens 183 transmits and focuses the spatially filtered image light to form an image of the scale track pattern TINC1 at the detector track DETINC1.

Thus, when the incremental scale track pattern TINC1 is illuminated, it outputs a track-specific spatially modulated light pattern to the detector track DETINC1 of the detector electronics 120. An image of the spatially modulated light pattern is formed at an image plane IMGP, which may be made to be coplanar with the detector track DETINC1 (the image plane IMGP being shown separately in FIG. 1 for purposes of illustration). As shown in the image plane IMGP, the pattern of the scale image SI has a modulated scale image pitch $P_{si}$, which, in one specific example embodiment, may be relatively coarse (e.g., 20 microns).

Similar to the imaging of the spatially modulated light pattern from the incremental scale track pattern TINC1 on the detector track DETINC1, when the scale track patterns TREF1 and TABS1 are illuminated by the light from the lens 140, they output track-specific spatially modulated light patterns (e.g., patterned light corresponding to their patterns) to the track-specific detector tracks DETREF1 and DETABS1, respectively, of the detector electronics 120. As noted above, the reference scale track pattern TREF1 (e.g., with barker patterns) indicates a particular incremental wavelength, so that the wavelength from the incremental scale track pattern TINC1 is not ambiguous relative to the absolute mark from the absolute scale track pattern TABS1. It will be appreciated that all of the spatially modulated light patterns move in tandem with the scale 110.

As will be described in more detail below with respect to FIG. 11, in each of the detector tracks DETINC1, DETABS1, and DETREF1, individual photodetector areas are arranged to spatially filter their respective received spatially modulated light patterns to provide desirable position indicating signals (e.g., the incremental detector track DETINC1 producing quadrature signals, or other periodic signals having a spatial phase relationship that is conducive to signal interpolation). In some embodiments, rather than individual photodetector areas, a spatial filter mask with individual apertures may mask relatively larger photodetectors to provide light receiving areas analogous to the individual photodetector areas, to provide a similar overall signal effect according to known techniques.

In various applications, the detector electronics and light source are mounted in a fixed relationship relative to one another, e.g., in a readhead or gauge housing (not shown), and are guided along the measuring axis relative to the scale 110 by a bearing system, according to known techniques. The scale may be attached to a moving stage, or a gauge spindle, or the like, in various applications. It will be appreciated that the configuration shown in FIG. 1 is a transmissive configuration. That is, the scale pattern 115 comprises light blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the light source and the detector electronics are arranged on the same side of the scale 110, and positioned for angled illumination and reflection if necessary, according to known techniques.

In either transmissive or reflective scale patterns, the portions of the scale pattern that provide the light that is detected by the detector tracks (e.g., DETABS1, DETREF1, or DETINC1) may be referred to as the signal producing portions of the scale pattern, and it will be understood that other portions of the scale pattern generally provide as little light as possible to the detector tracks and may be referred to as signal diminishing portions. It will be appreciated that the signal producing portions or the signal diminishing portions of the scale pattern may be patterned according to the teachings herein, in various embodiments. Stated another way, scale patterns which are "negatives" of each other may both produce useable signals, with the resulting signal variations also being approximately the "negative" of each other for a given reflective or transmissive arrangement. Thus, the scale patterns may be described in terms of "signal varying portions," and it will be understood that in various embodiments, the signal varying portions may comprise either the signal producing portions or the signal diminishing portions of the scale pattern.

Figure 2A:
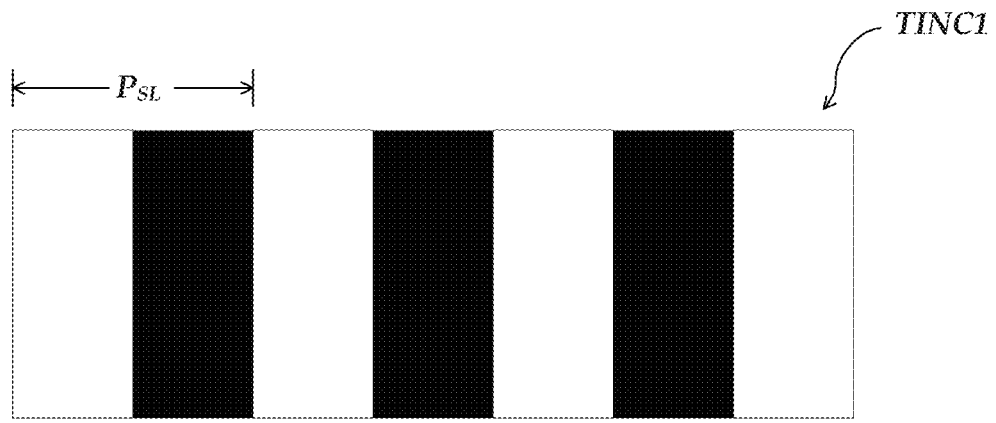
FIGS. 2A-2C are diagrams of the incremental scale track pattern, image intensity, and detector arrangement of the encoder configuration of FIG. 1.
Figure 2B:
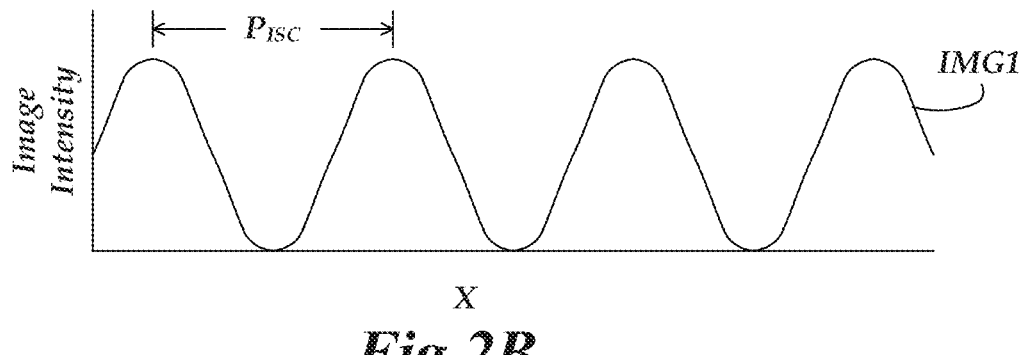
Figure 2C:
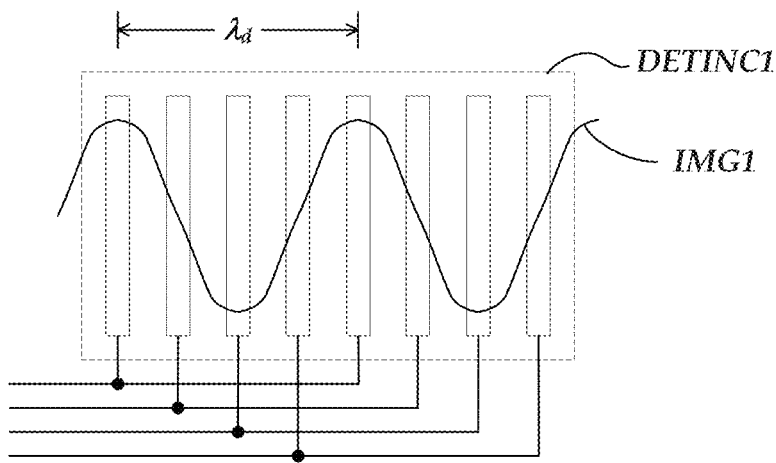

FIGS. 2A-2C illustrate various aspects related to the optical signal channel corresponding to the incremental scale track pattern TINC1 of FIG. 1. More specifically, FIG. 2A illustrates the incremental scale track pattern TINC1 which has a scale pitch $P_{SL}$. FIG. 2B is a graph of the resulting image intensity signal IMG1 from the light from the incremental scale track TINC1 at the detector plane DP. As shown in FIG. 2B, the resulting image intensity has been spatially filtered (e.g., by the aperture 182) so as to produce an approximately sinusoidal signal (e.g., as opposed to a square wave signal, such as would be produced from a non-filtered signal from the incremental scale track pattern TINC1) and has a signal period $P_{ISC}$. FIG. 2C is a diagram of the incremental detector track DETINC1 which, for purposes of illustration, has an image of the image intensity signal IMG1 from FIG. 2B superimposed upon it. As shown in FIG. 2C, the detector track DETINC1 is connected so as to output quadrature signals, with four detector elements being within one period of the detector track wavelength λd, which also corresponds to one period $P_{ISC}$ of the image intensity signal IMG1.

Figure 3:
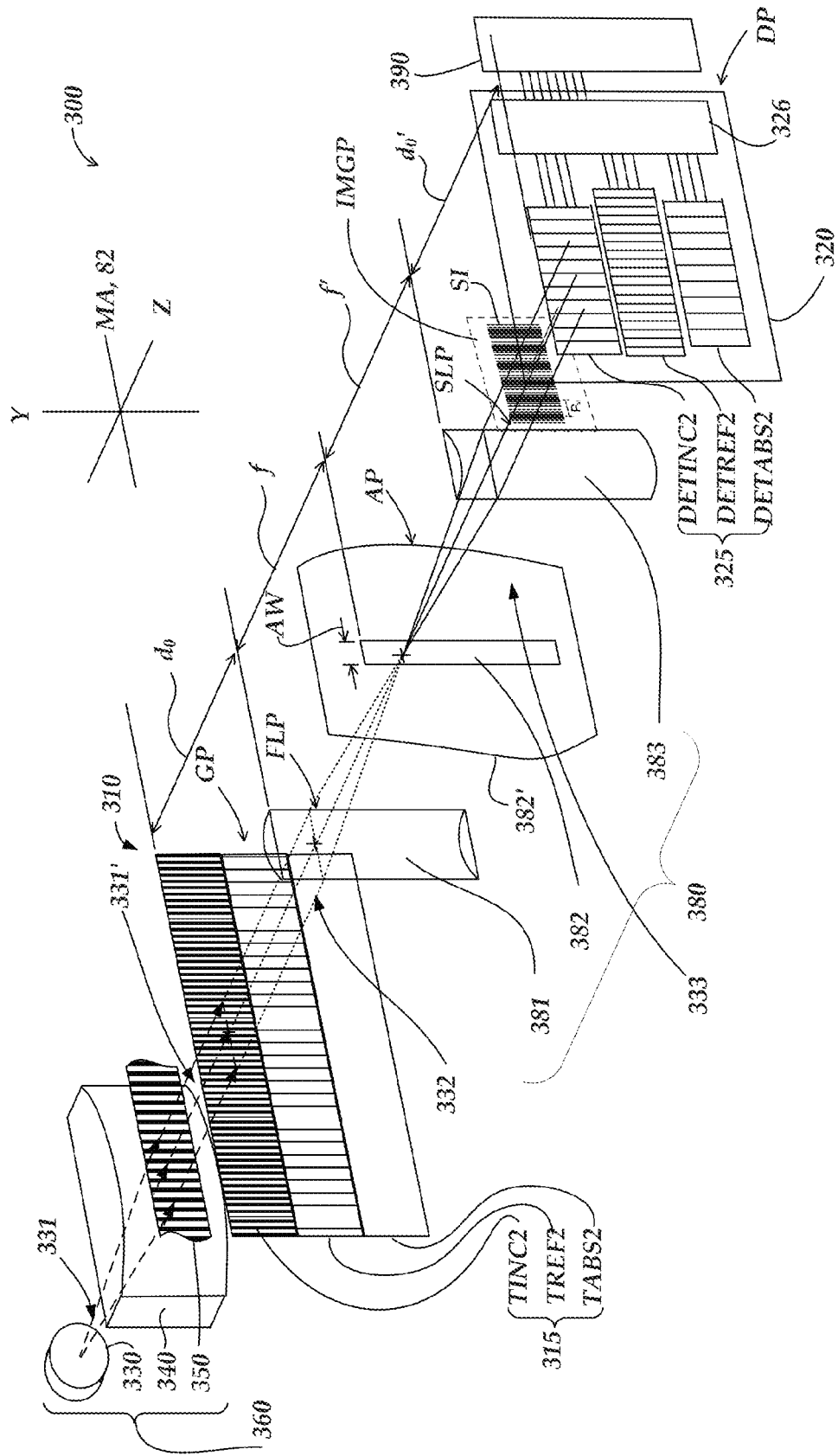
FIG. 3 is a partially schematic exploded diagram of an encoder configuration with a doubly telecentric arrangement and a scale with absolute, reference, and incremental track patterns, and utilizing spatial filtering and imaging principles in accordance with principles disclosed herein.

FIG. 3 is a partially schematic exploded diagram of an encoder configuration 300 with a doubly telecentric arrangement and a scale with absolute, reference, and incremental track patterns, and utilizing spatial filtering and imaging techniques in accordance with the principles disclosed herein. Certain of the components and operating principles of the encoder configuration 300 are approximately similar to those of the encoder configuration 100 of FIG. 1, and may generally be understood by analogy. For example, 3XX series numbers in FIG. 3 that have the same "XX" suffix as 1XX series numbers in FIG. 1 may designate similar or identical elements, which may function similarly, except as otherwise described or implied below.

As shown in FIG. 3, the encoder configuration 300 includes a scale element 310, an illumination system or portion 360, and a doubly telecentric imaging configuration 380. The illumination system or portion 360 includes a light source 330 (e.g., an LED) for emitting visible or invisible wavelengths of light, a lens 340, and a phase grating 350. As will be described in more detail below, the phase grating 350 may, in at least one embodiment, be utilized for producing structured light patterns and may be located within the optical signal path channels for the incremental and reference scale track patterns TINC2 and TREF2, but not the absolute scale track pattern TABS2. The doubly telecentric imaging configuration 380 comprises a first lens 381 at a first lens plane FLP, an aperture 382 in an aperture component 382' at an aperture plane AP, a second lens 383 at a second lens plane SLP, and detector electronics 320 at a detector plane DP. The detector electronics 320 may be connected to signal generating and processing circuitry 390. The light source 330 may also be connected to the signal generating and processing circuitry 390 by power and signal connections (not shown).

In the embodiment shown in FIG. 3, the scale element 310 includes a scale pattern 315 that comprises three scale track patterns: an absolute scale track pattern TABS2, a reference scale track pattern TREF2, and an incremental scale track pattern TINC2. In at least one embodiment, a conventional absolute scale track pattern may be utilized for the absolute scale track pattern TABS2. In at least one embodiment, the absolute scale track pattern TABS2 may have a relatively "coarse" ABS resolution, on the order of the detector dimension along the X-axis.

As will be described in more detail below, the encoder configuration 300 is designed to utilize certain spatial filtering and imaging principles that allow a fine pitch scale to provide larger pitch fringes that correspond to the detector element pitch of an economical detector that senses the scale displacement. In order to produce the desired fringes, the phase grating 350 is an illumination grating which is designed to have a pitch that is close to the pitch of the incremental scale track pattern TINC2 and the reference scale track pattern TREF2 (e.g., a phase grating pitch of 5 microns as compared to an incremental scale track pitch of 4 microns, and a reference scale track pitch of 4.1 microns). The resulting fringe period from the phase grating 350 and incremental scale track pattern TINC2 may be relatively coarse (e.g., 20 microns) and may be slightly different than the fringe period produced by the phase grating 350 and the reference scale track pattern TREF2 (e.g., 22.77 microns).

As will be described in more detail below, the detected pattern is imaged with spatial filtering by the double telecentric imaging configuration 380, including the aperture 382 that blurs out or removes the high spatial frequencies corresponding to the incremental and reference scale track patterns TINC2 and TREF2. In certain implementations, the parameters are chosen so that the resulting modulated image pitch of the spatially filtered pattern matches the pitch of a predetermined given detector (e.g., a detector designed for a 20 micron incremental scale track pitch). Suitable aperture dimensions may be chosen to achieve the desired effect of the spatial filtering that removes the high spatial frequencies and results in the desired pattern fringe period. Certain teachings regarding such aperture dimensions for achieving desired spatial wavelength filtering are described in more detail in commonly assigned U.S. Pat. No. 7,186,969, which is hereby incorporated by reference in its entirety.

As will be described in more detail below with reference to FIG. 10B, in at least one embodiment, the reference scale track pattern TREF2 may include a series of reference marks which may be formed as barker patterns. The reference marks may also serve as Vernier reference marks. The reference scale track pattern TREF2 is designed so that it can be resolved to a level that allows it to indicate a particular incremental wavelength for the incremental scale track pattern TINC2, so that the incremental wavelengths are not ambiguous relative to an absolute mark from the absolute scale track pattern TABS2. In at least one embodiment, the combination of the reference track pattern TREF2 (e.g., a barker pattern) and the incremental track pattern TINC2 may create a synthetic wavelength whose measured synthetic phase points to the correct incremental scale track pattern cycle (e.g., a measured synthetic phase of zero may indicate a correct incremental cycle corresponding to that phase).

As a specific example, the reference scale track pattern TREF2 may have a slightly different pitch (e.g., 4.1 microns producing a modulated and spatially filtered fringe pattern with a period of 22.77 microns) as compared to the pitch of the incremental scale track pattern TINC2 (e.g., 4.0 microns producing a modulated and spatially filtered fringe pattern with a period of 20 microns) so that the reference scale track pattern phase matches the incremental scale track pattern phase only at one specific point along a specified length (e.g., only matches at one point along a barker pattern length within the reference scale track pattern). The position where the phases match defines a particular incremental wavelength for the incremental scale track pattern TINC2.

In one specific example embodiment, in the reference scale track pattern TREF2, barker patterns may be provided at selected intervals (e.g., 0.6 millimeters). The phase of each barker pattern (e.g., at the center of the pattern) matches (or has a constant phase offset from) the phase of the incremental scale track pattern TINC1 at the locations that are the specified distance (e.g., 0.6 millimeters) apart. The synthetic wavelength of the incremental scale track pattern TINC2 and the reference scale track pattern TREF2 is larger than the barker pattern length. In at least one embodiment, this relationship may be expressed by stating that the synthetic wavelength of the incremental scale track pattern and the reference (e.g., barker) scale track pattern is larger than the barker pattern length L, such that $L<pp'/(p'-p)$, where p is the pitch of the incremental scale track pattern TINC2, and p' is the pitch of the barker pattern in the reference scale track pattern TREF2.

As shown in FIG. 3, the detector electronics 320 includes a detector configuration 325 comprising three detector tracks, DETABS2, DETREF2, and DETINC2, arranged to receive light from the three scale track patterns, TABS2, TREF2, and TINC2, respectively. The detector electronics 320 may also include signal processing circuitry 326 (e.g., signal offset and/or gain adjustments, signal amplifying and combining circuits, etc.). In at least one embodiment, the detector electronics 320 may be fabricated as a single CMOS IC.

Figure 4:
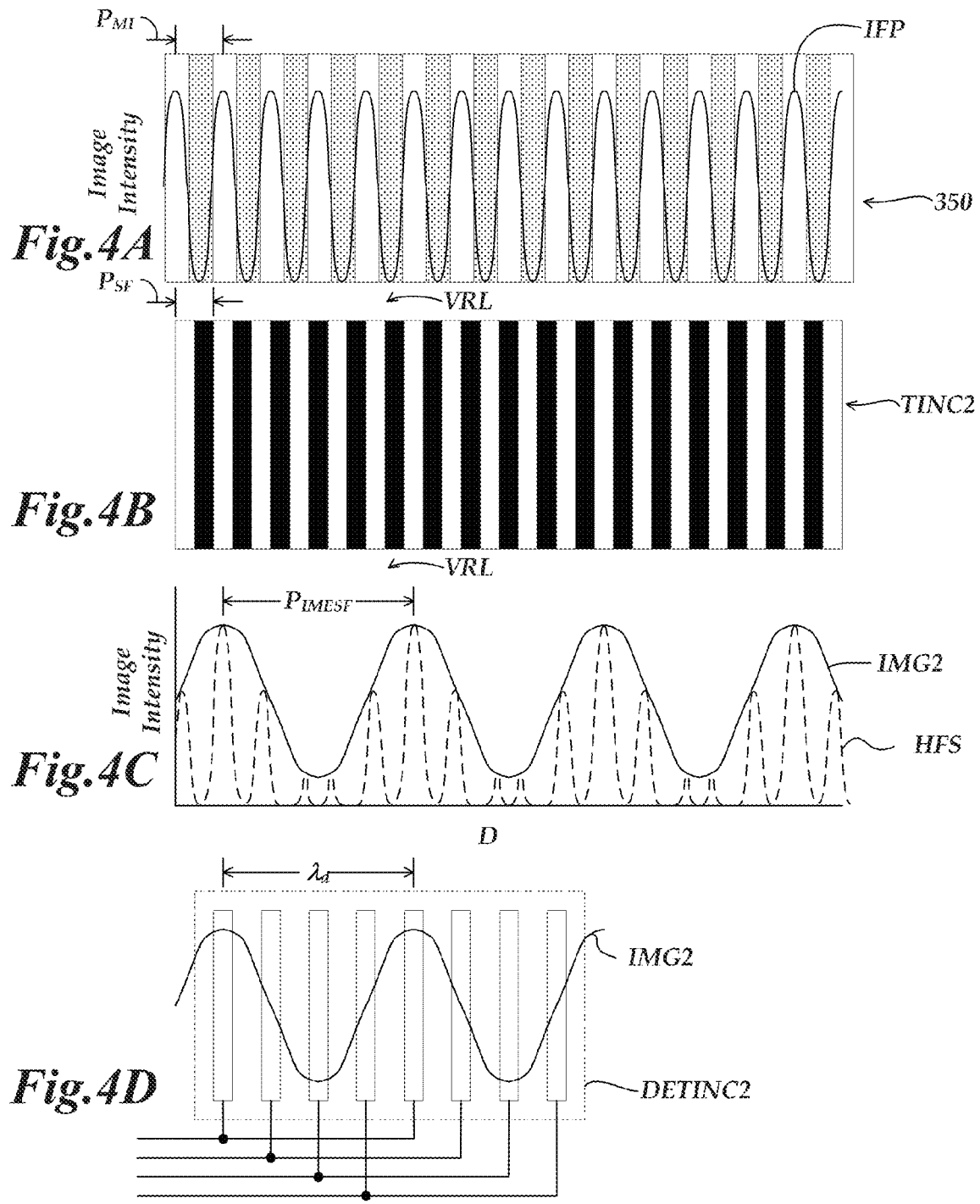
FIGS. 4A-4D are diagrams of the illumination fringe pattern, incremental scale track pattern, resulting moiré image intensity, and detector arrangement of the encoder configuration of FIG. 3.

In operation, light 331 (e.g., primary light) emitted from the light source 330 may be partially or fully collimated by the lens 340, over a beam area sufficient to illuminate the three scale track patterns TABS2, TREF2, and TINC2. The phase grating 350 is sized to diffract the source light to provide diffracted structured light 331' to the reference and incremental scale track patterns TREF2 and TINC2 (but not the absolute scale track pattern TABS2), in order to achieve the modulated and spatially filtered imaging effects described above. Then, as exemplified by the image channel for the incremental scale track pattern TINC2, the incremental scale track pattern TINC2 provides scale light 332 to the lens 381. It will be appreciated that the limiting aperture 382, which has an aperture width AW along the X-axis direction, acts as a spatial filter (as will be described in more detail below with respect to FIGS. 4 and 12) to select or limit the light rays that pass through the image channels. FIG. 3 illustrates three such light rays, two extreme rays and one central ray. As shown in FIG. 3, the lens 381 transmits the light rays towards the limiting aperture 382. The limiting aperture 382 transmits the rays as spatially filtered image light 333 to the second lens 383, and the second lens 383 transmits and focuses the spatially filtered image light to form a spatially modulated light pattern at the detector track DETINC2. As noted above, and as will be described in more detail below with respect to FIG. 4, in accordance with the principles disclosed herein the spatially modulated light pattern at the detector track DETINC comprises a modulated and spatially filtered fringe pattern.

Similarly, when the scale track patterns TREF2 and TABS2 are illuminated, they output track-specific spatially modulated light patterns (e.g., patterned light corresponding to their patterns) to the track-specific detector tracks DETREF2 and DETABS2, respectively, of the detector electronics 320. As noted above, the spatially modulated light pattern at the detector track DETREF2 also comprises a modulated and spatially filtered imaged fringe pattern. It will be appreciated that all of the spatially modulated light patterns move in tandem with the scale 310. In optical signal channels corresponding to each of the detector tracks DETINC2, DETABS2, and DETREF2, individual photodetector areas are arranged to spatially filter their respective received spatially modulated light patterns to provide desirable position indicating signals (e.g., for the incremental scale track pattern TINC2 producing quadrature signals, or other periodic signals having a spatial phase relationship that is conducive to signal interpolation). In some embodiments, rather than individual photodetector areas, a spatial filter mask with individual apertures may mask relatively larger photodetectors to provide light receiving areas analogous to the individual photodetector areas illustrated, to provide a similar overall signal effect according to known techniques.

In various applications, the detector electronics 320 and light source 330 are mounted in a fixed relationship relative to one another, e.g., in a readhead or gauge housing (not shown), and are guided along the measuring axis relative to the scale 310 by a bearing system, according to known techniques. The scale may be attached to a moving stage, or a gauge spindle, or the like, in various applications.

FIGS. 4A-4D illustrate various aspects related to the optical signal channel corresponding to the incremental scale track pattern TINC2 of FIG. 3. More specifically, FIG. 4A illustrates the illumination fringe pattern IFP produced by the phase grating 350. The illumination fringe pattern IFP is shown to have a pitch $P_{MI}$ (e.g., microns). FIG. 4B illustrates the incremental scale track pattern TINC2 which has a scale pitch $P_{SF}$ (e.g., 4 microns). FIG. 4C is a graph of the resulting image intensity signal IMG2 from the light from the combination of the fringe grating 350 and the incremental scale track TINC2 at the detector plane DP. As shown in FIG. 4C, the resulting image intensity includes moiré fringes with a beat frequency with an overall sinusoidal envelope pattern that has a modulated image pitch $P_{IMESF}$ (e.g., 20 microns.) As described above, the image intensity has been spatially filtered (e.g. by the aperture 182) so as to filter out the high frequency signals HFS from the phase grating 350 and incremental scale track pattern TINC2 in order to produce the approximately sinusoidal envelope signal for the moiré imaged fringes, with the resulting modulated image pitch $P_{IMESF}$.

In various embodiments, the aperture 350 is configured such that the aperture width $AW=F*\lambda*(a/(P_{MI}P_{SF}/(P_{MI}-P_{SF})))$, where a is greater than 2.0 and less than 6.0. The spatially modulated image light comprises fringes (shown in detail in FIG. 4C) formed from the interference of two diffractive orders which differ by a value $\Delta n$. For example, in some embodiments, if the moiré image intensity signal IMG2 comes from the overlap of a +1 and a −1 diffractive order component of the scale light 332, then $\Delta n = 2$. In other exemplary embodiments, $\Delta n$ may be 1 or 4. The image intensity signal IMG2 is modulated by an intensity modulation envelope that has a spatial wavelength $P_{IMESF}$ that depends on the scale pitch $P_{SF}$ and the illumination fringe pitch $P_{MI}$, and $P_{SF}$ and $P_{MI}$ are selected to cooperate with a detector pitch Pd of the detector track DETINC2 such that $\Delta nP_{MI}P_{SF}/(\Delta nP_{MI}-P_{SF})=P_{IMESF}=m*Pd/k$ when the light source outputs incoherent light and $\Delta nP_{MI}P_{SF}/(2\Delta nP_{MI}-P_{SF})=P_{IMESF}=m*Pd/k$ when the light source outputs incoherent light, where m is a number of phase signals output by the detector portion and k is an odd integer, wherein the spatial wavelength $P_{IMESF}$ is larger than the scale pitch $P_{SF}$.

A series of vertical reference lines VRL drawn between FIGS. 4A, 4B, and 4C provide an indication of signal levels from the illumination fringe pattern of FIG. 4A that pass through the incremental scale track pattern TINC2 of FIG. 4B, and appear as corresponding signal intensities in the resulting moiré image intensity of FIG. 4C. FIG. 4D is a diagram of the incremental detector track DETINC2 which, for purposes of illustration, has an image of the beat frequency envelope of the moiré image intensity signal IMG2 from FIG. 4C superimposed upon it. As shown in FIG. 4D, the detector track DETINC2 is connected so as to output quadrature signals, with four detector elements being within one period of the detector pitch Pd which also corresponds to one period $P_{IMESF}$ of the moiré image intensity signal IMG2.

Figure 5:
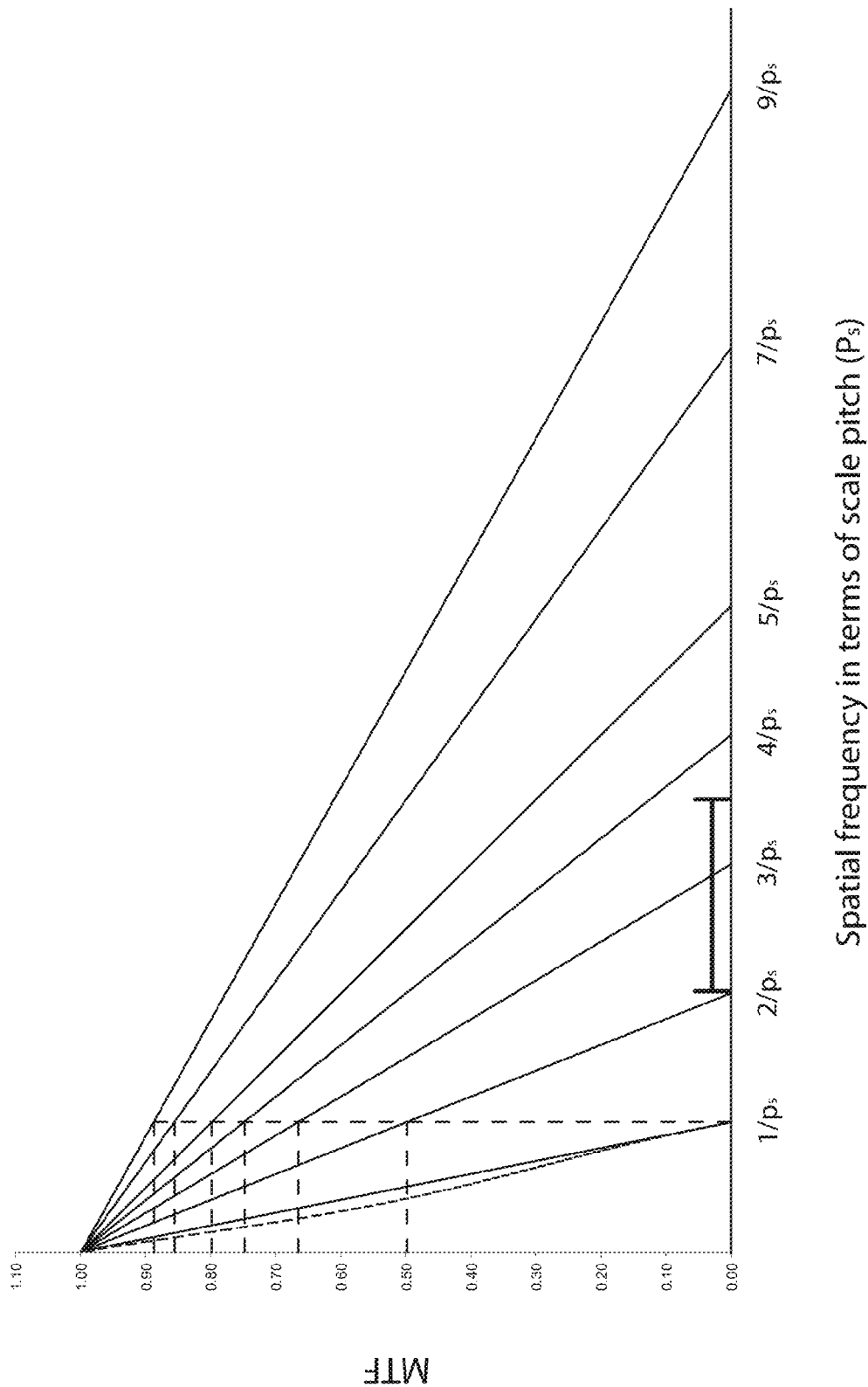
FIG. 5 is a chart illustrating modulation transfer functions corresponding to various sets of design parameters.
Figure 6:
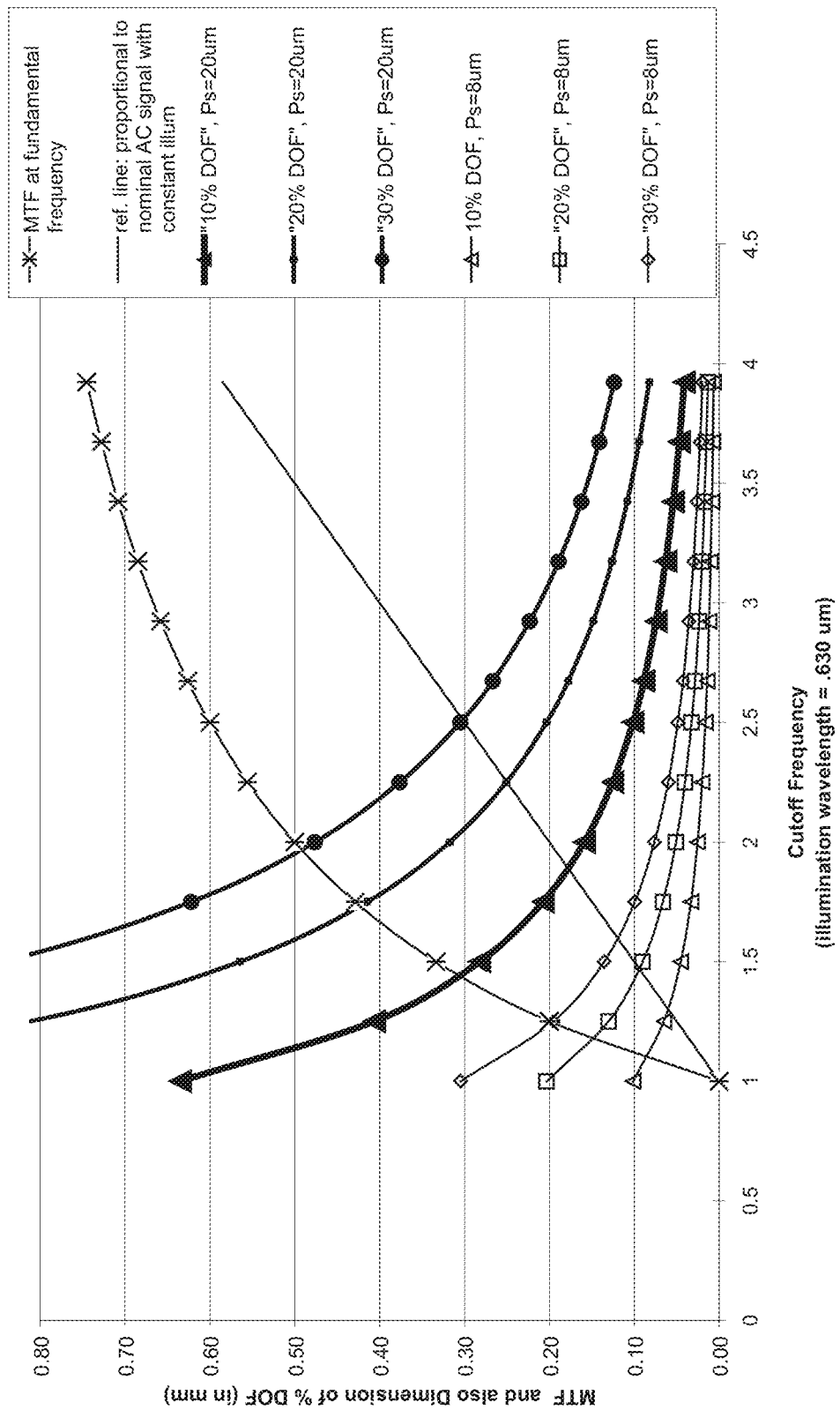
FIG. 6 is a chart illustrating the dependence of depth of field (% DOF), spatial harmonic content, and optical signal power on the dimension of an aperture along the measuring axis direction.

FIGS. 5 and 6 show basic design reference information included in FIGS. 26 and 27, respectively of the previously incorporated U.S. Pat. No. 7,186,969. The use of FIGS. 5 and 6 in relation to the selection of aperture sizes in various embodiments may be understood based on the disclosure of the '969 patent, and will not be described in detail herein. However, the related teachings may be used in the context of this disclosure. Much of the description of the '969 patent is in terms of incoherent illumination. One skilled in the art will make appropriate adaptations to its teachings based on known considerations related to the differences between incoherent and coherent illumination in imaging systems.

Figure 7:
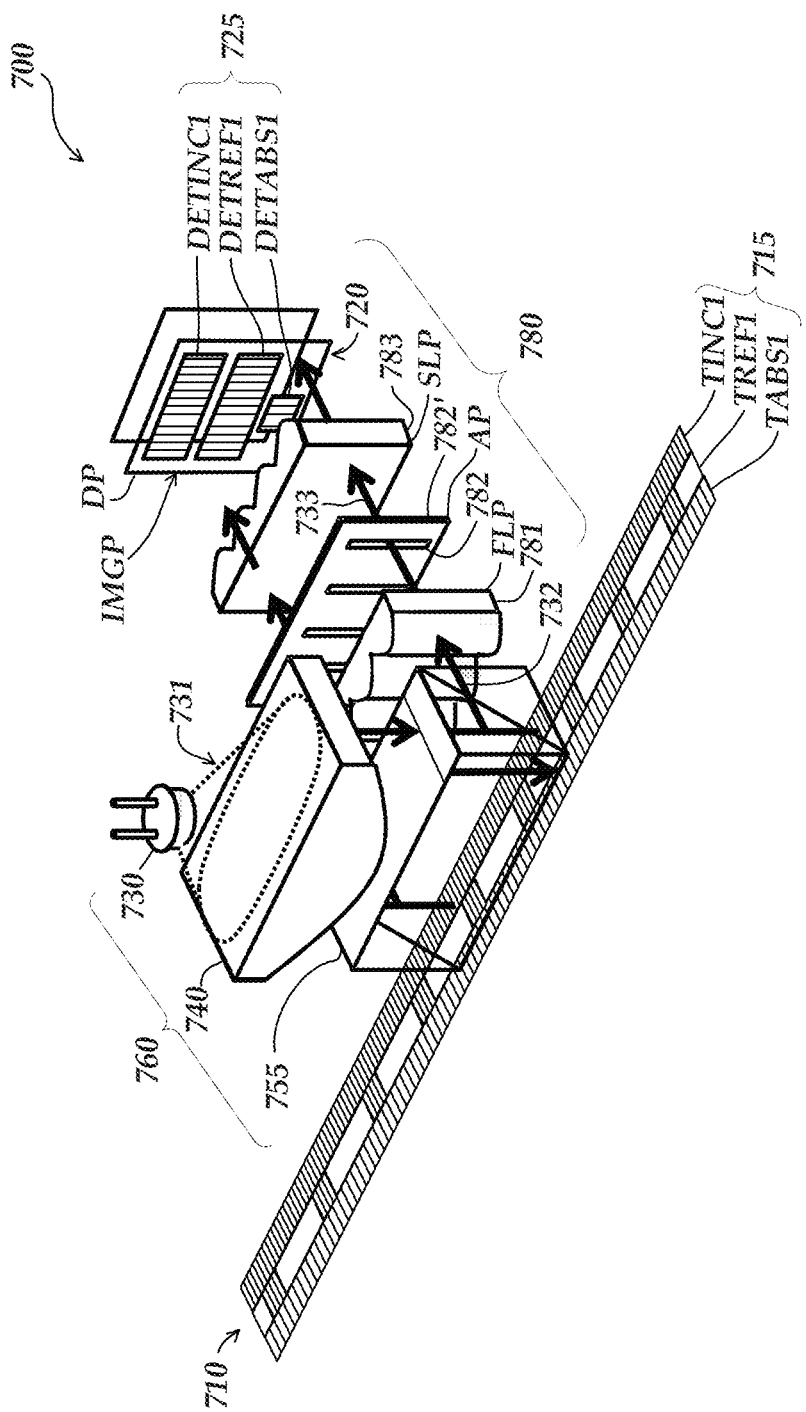
FIG. 7 is a partially schematic exploded diagram of one exemplary embodiment of the encoder configuration of FIG. 1.

FIG. 7 is a partially schematic exploded diagram of an encoder configuration 700 that is one exemplary embodiment of a practical implementation of the encoder configuration 100 of FIG. 1. Certain of the components and operating principles of the encoder configuration 700 are approximately similar to those of the encoder configuration 100 of FIG. 1, and may generally be understood by analogy. For example, the 7XX series numbers in FIG. 7 that have the same "XX" suffix as 1XX series numbers in FIG. 1 may designate similar or identical elements, which may function similarly, except as otherwise described or implied below.

As shown in FIG. 7, the encoder configuration 700 includes a scale element 710, an illumination system or portion 760, and a doubly telecentric imaging configuration 780. The illumination system or portion 760 includes a light source 730 (e.g., an LED) for emitting visible or invisible wavelengths of light, a lens 740, and a beam splitter 755. The doubly telecentric imaging configuration 780 comprises a first lens array 781 at a first lens plane FLP, an aperture array 782 in an aperture component 782' at an aperture plane AP, a second lens array 783 at a second lens plane SLP, and detector electronics 720 at a detector plane DP. The detector electronics 720 may be connected to signal generating and processing circuitry (not shown). The light source 730 may also be connected to the signal generating and processing circuitry by power and signal connections (not shown).

With regard to the lens arrays 781 and 783 and the aperture array 782, it will be appreciated that each of these include individual elements that are similar to the first lens 181, aperture 182, and second lens 183 of the encoder configuration 100 of FIG. 1. In FIG. 7, in each of the arrays, each of the individual elements similarly cooperate to provide an individual image path or channel which may be referred to as an image channel or image channel configuration. Each of the image channels operates similarly to the image channel for the single lenses and aperture of the encoder configuration 100 described above with respect to FIG. 1. In the embodiment of FIG. 7, the multiple image channels are utilized to provide additional levels of robustness for the system with respect to contamination, defects, scale waviness, etc., in that if a single image channel becomes contaminated or otherwise inhibited, the remaining image channels may still continue to provide accurate imaging of the scale patterns.

In the embodiment shown in FIG. 7, the scale element 710 includes a scale pattern 715 that comprises the three scale track patterns described above with respect to FIG. 1, including: the absolute scale track pattern TABS1, the reference scale track pattern TREF1, and the incremental scale track pattern TINC1. In at least one embodiment, the absolute scale track pattern TABS1 may have a very "coarse" ABS resolution, on the order of the detector dimension along the X-axis.

For the incremental scale track pattern TINC1, in at least one embodiment the incremental pitch may be relatively coarse (e.g., 20 microns). As will be described in more detail below with respect to FIG. 8, a finer pitch (e.g., 4 microns) may be implemented in a similarly sized encoder configuration in accordance with the principles disclosed herein. As will be described in more detail below with respect to FIG. 10A, in at least one embodiment, the reference scale track pattern TREF1 may comprise a series of reference marks which may be formed as a series of barker patterns which may also serve as Vernier reference marks, and which may be formed according to a variety of known techniques.

The detector electronics 720 includes a detector configuration 725 comprising the three detector tracks DETABS1, DETREF1, and DETINC1, which are arranged to receive light from the three scale track patterns TABS1, TREF1, and TINC1, respectively. The detector electronics 720 may also include signal processing circuitry (e.g., signal offset and/or gain adjustments, signal amplifying and combining circuits, etc.). In at least one embodiment, the detector electronics 720 may be fabricated as a single CMOS IC.

In operation, light 731 (e.g., primary light) emitted from the light source 730 may be partially or fully collimated by the lens 740 and is directed through the beam splitter 755 over a beam area sufficient to illuminate the three scale track patterns TABS1, TREF1, and TINC1. Then, as exemplified by the image channel for the incremental scale track pattern TINC1, the incremental scale track pattern TINC1 provides scale light 732 that is redirected by the beam splitter 755 toward the lens array 781. It will be appreciated that each limiting aperture of the aperture array 782, each of which has an aperture width AW along the X direction, acts as a spatial filter (as described above with respect to FIG. 2) to select or limit the light rays that pass through the given image channel for the incremental scale track pattern TINC1. As shown in FIG. 7, for each image channel, the corresponding lenses of the lens array 781 transmit the light rays towards the corresponding apertures of the limiting aperture array 782. The corresponding apertures of the limiting aperture array 782 then transmit the rays as spatially filtered image light 733 to the respective lenses of the second lens array 783, and the respective lenses of the second lens array 783 transmit and focus the spatially filtered image light to form respective spatially modulated light patterns corresponding to the respective portions of the incremental scale track pattern TINC1 at the respective portions of the detector track DETINC1.

Thus, when the incremental scale track pattern TINC1 is illuminated, it outputs a series of track-specific spatially modulated light patterns to the respective portions of the detector track DETINC1 of the detector electronics 720, corresponding to each respective image channel. An image of the spatially modulated light patterns is formed at an image plane IMGP, which may be made to be coplanar with the detector track DETINC1.

Similar to the imaging of the spatially modulated light patterns from the incremental scale track pattern TINC1 on the detector track DETINC1, when the scale track patterns TREF1 and TABS1 are illuminated by the light from the lens 740, they output track-specific spatially modulated light patterns (e.g., patterned light corresponding to their patterns) to the track-specific detector tracks DETREF1 and DETABS1, respectively, of the detector electronics 720. As noted above, the reference scale track pattern TREF1 (e.g., with barker patterns) can be resolved to indicate a particular incremental wavelength, so that the wavelength from the incremental scale track pattern TINC1 is not ambiguous relative to the absolute mark from the absolute scale track pattern TABS1. It will be appreciated that all of the spatially modulated light patterns move in tandem with the scale 710. In each of the detector tracks DETINC1, DETABS1, and DETREF1, individual photodetector areas are arranged to spatially filter their respective received spatially modulated light patterns to provide desirable position indicating signals (e.g., the incremental detector track DETINC1 producing quadrature signals, or other periodic signals having a spatial phase relationship that is conducive to signal interpolation).

In various applications, the detector electronics and light source are mounted in a fixed relationship relative to one another, e.g., in a readhead or gauge housing (not shown), and are guided along the measuring axis relative to the scale 710 by a bearing system, according to known techniques. The scale may be attached to a moving stage, or a gauge spindle, or the like, in various applications. The configuration shown in FIG. 7 is a reflective configuration. That is, the light source and the detector electronics are arranged on the same side of the scale 710, and positioned for angled illumination and reflection, according to known techniques. Thus, the scale pattern 715 comprises light-absorbing portions and light reflecting portions (e.g., fabricated on a substrate using known reflecting techniques) that output the spatially modulated light patterns to the detector tracks by reflection. It will be appreciated that similar components may be arranged in transmissive embodiments (e.g., see FIG. 1).

Figure 8:
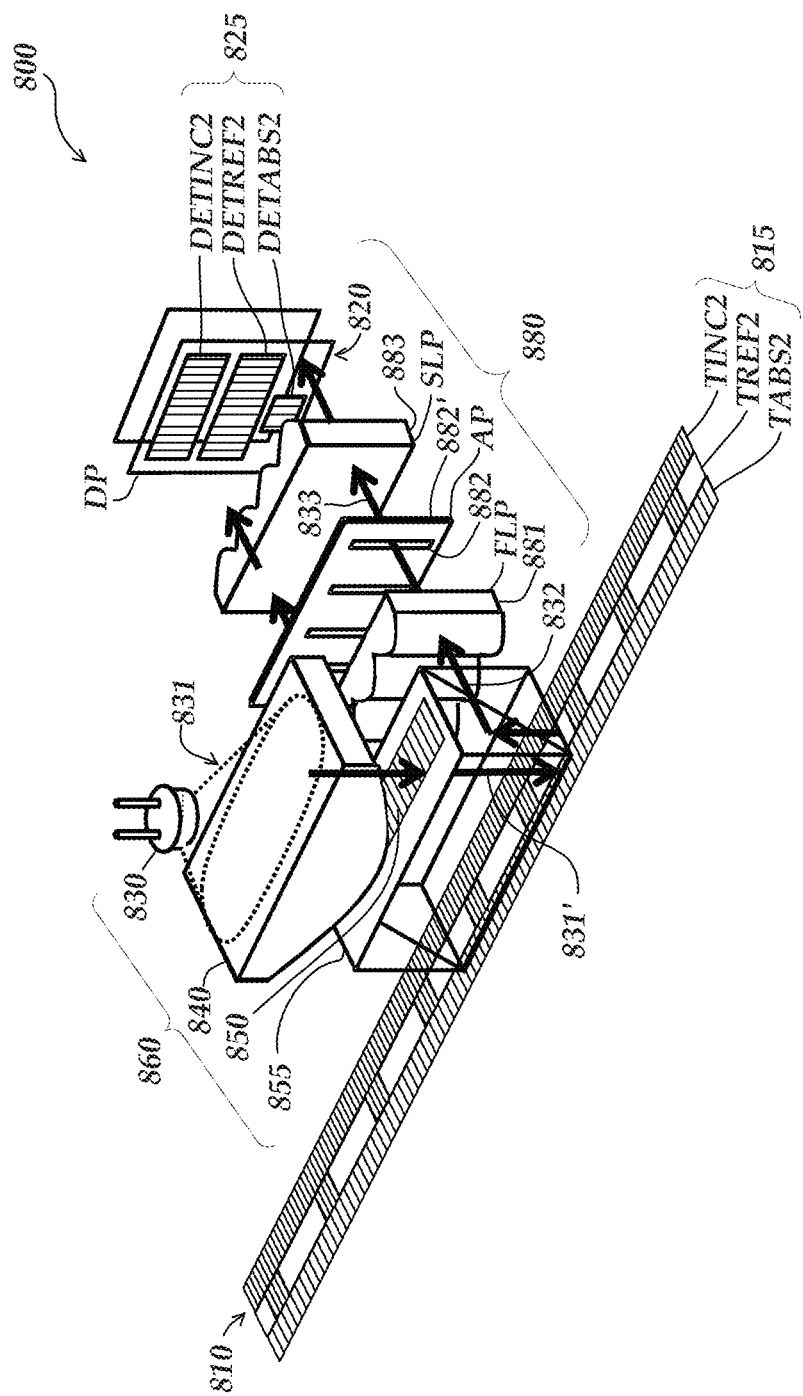
FIG. 8 is a partially schematic exploded diagram of one exemplary embodiment of the encoder configuration of FIG. 3.

FIG. 8 is a partially schematic exploded diagram of an encoder configuration 800 that is one exemplary embodiment of a practical implementation of the encoder configuration 300 of FIG. 3. Certain of the components and operating principles of the encoder configuration 800 are approximately similar to those of the encoder configuration 300 of FIG. 3, and may generally be understood by analogy. For example, the 8XX series numbers in FIG. 8 that have the same "XX" suffix as 3XX series numbers in FIG. 3 may designate similar or identical elements, which may function similarly, except as otherwise described or implied below.

As shown in FIG. 8, the encoder configuration 800 includes a scale element 810, an illumination system or portion 860, and a doubly telecentric imaging configuration 880. The illumination system or portion 860 includes a light source 830 (e.g., an LED) for emitting visible or invisible wavelengths of light, a lens 840, a phase grating 850, and a beam splitter 855. As will be described in more detail below, the phase grating 850 may, in at least one embodiment, be placed and sized within the image channels for the incremental and reference scale track patterns TINC2 and TREF2, but not the absolute scale track pattern TABS2. The doubly telecentric imaging configuration 880 comprises a first lens array 881 at a first lens plane FLP, an aperture array 882 at an aperture plane AP, a second lens array 883 at a second lens plane SLP, and a detector electronics 820 at a detector plane DP. It will be appreciated that the lens arrays 881 and 883, and the aperture array 882, are arranged and operate similarly to the lens arrays 781 and 783 and the aperture array 782 described above with respect to FIG. 7. The detector electronics 820 may be connected to signal generating and processing circuitry (not shown). The light source 830 may also be connected to the signal generating and processing circuitry by power and signal connections (not shown).

In the embodiment shown in FIG. 8, the scale element 810 includes a scale pattern 815 that comprises the three scale track patterns described above with respect to FIG. 3, including the absolute scale track pattern TABS2, the reference scale track pattern TREF2, and the incremental scale track pattern TINC2. In at least one embodiment, the absolute scale track pattern TABS2 may have a relatively "coarse" ABS resolution, on the order of the detector dimension along the X-axis. As described above with respect to FIG. 3, the reference scale track pattern TREF2 and the incremental scale track pattern TINC2 are utilized and imaged in accordance with the spatial filtering and imaging principles disclosed herein.

As shown in FIG. 8, the detector electronics 820 includes a detector configuration 825 comprising the three detector tracks DETABS2, DETREF2, and DETINC2, arranged to receive light from the three scale track patterns TABS2, TREF2, and TINC2, respectively. The detector electronics 820 may also include signal processing circuitry (e.g., signal offset and/or gain adjustments, signal amplifying and combining circuits, etc.). In at least one embodiment, the detector electronics 820 may be fabricated as a single CMOS IC.

In operation, light 831 (e.g., primary light) emitted from the light source 830 may be partially or fully collimated by the lens 840 and directed through the beam splitter 855 over a beam area sufficient to illuminate the three scale track patterns TABS2, TREF2, and TINC2. The phase grating 850 is sized to diffract the source light to provide diffracted structured light 831' to the reference and incremental scale track patterns TREF2 and TINC2 (but not the absolute scale track pattern TABS2). Then, as exemplified by the image channel for the incremental scale track pattern TINC2, the incremental scale track pattern TINC2 outputs scale light 832 that is redirected by the beam splitter 855 toward the lens array 881. It will be appreciated that each limiting aperture of the aperture array 882, each of which has an aperture width AW along the X direction, acts as a spatial filter (as described above with respect to FIG. 4) to select or limit the light rays that pass through the given image channels. In other words, as described above, the spatial filtering effectively blurs out the high-frequency portions of the images produced by the phase grating and incremental scale track patterns, so that the remaining signal primarily consists of the modulation which may be thought of as the beat frequency between the fringe pitch of the structured illumination and the pitch of the scale grating. The resulting modulated image pitch is a measurement of the period of that beat frequency envelope.

As shown in FIG. 8, for each image channel, the corresponding lenses of the lens array 881 transmit the light rays towards the corresponding apertures of the limiting aperture array 882. The corresponding apertures of the limiting aperture array 882 transmit the rays as spatially filtered image light 833 to the respective lenses of the second lens array 883, and the respective lenses of the second lens array 883 transmit and focus the spatially filtered image light to form respective spatially modulated light patterns corresponding to the respective portions of the incremental scale track pattern TINC2 at the respective portions of the detector track DETINC2. As described above with respect to FIG. 4, in accordance with the principles disclosed herein, the spatially modulated light patterns at the detector track DETINC2 comprise modulated and spatially filtered imaged fringe patterns.

Similarly, when the scale track patterns TREF2 and TABS2 are illuminated, they output track-specific spatially modulated light patterns to the track-specific detector tracks DETREF2 and DETABS2, respectively, of the detector electronics 820. As noted above, the spatially modulated light patterns at the reference detector track DETREF2 also comprise modulated and spatially filtered imaged fringe patterns. It will be appreciated that all of the spatially modulated light patterns move in tandem with the scale 810. In optical signal channels corresponding to each of the detector tracks DETINC2, DETABS2, and DETREF2, individual photodetector areas are arranged to spatially filter their respective received spatially modulated light patterns to provide desirable position indicating signals (e.g., the incremental detector track DETINC2 producing quadrature signals, or other periodic signals having a spatial phase relationship that is conducive to signal interpolation).

In various applications, the detector electronics 820 and light source 830 are mounted in a fixed relationship relative to one another, e.g., in a readhead or gauge housing (not shown), and are guided along the measuring axis relative to the scale 810 by a bearing system, according to known techniques. The scale may be attached to a moving stage, or a gauge spindle, or the like, in various applications. The configuration shown in FIG. 8 is a reflective configuration. That is, the light source 830 and the detector electronics 820 are arranged on the same side of the scale 810 and positioned for angled illumination and reflection, according to known techniques. Thus, the same scale pattern 815 comprises light absorbing portions and light reflecting portions (e.g., fabricated on a substrate using known techniques) that output the spatially modulated light patterns to the detector tracks by reflection. It will be appreciated that similar components may be arranged in transmissive embodiments (e.g., see FIG. 3).

Figure 9:
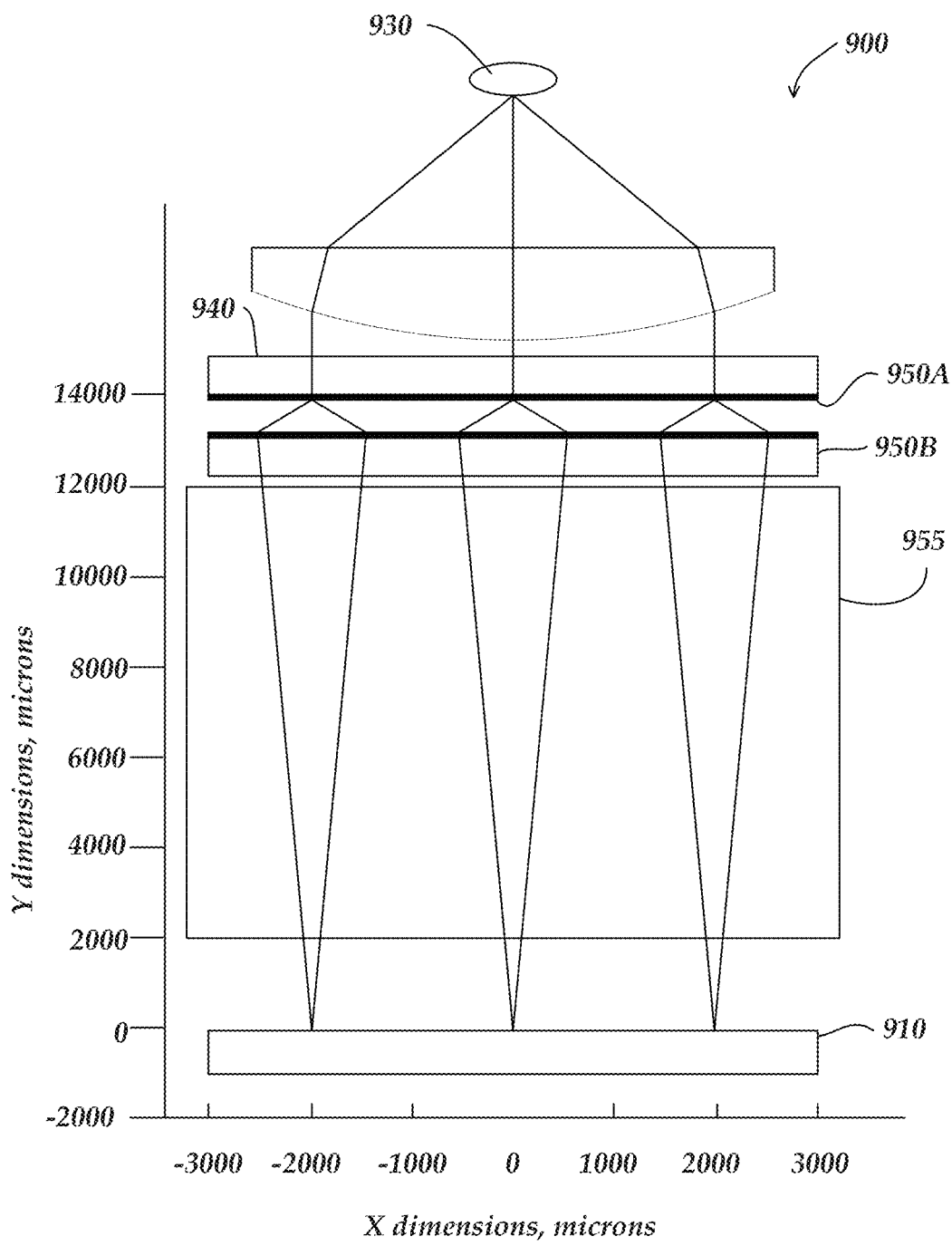
FIG. 9 is a diagram of an alternative configuration of the phase grating portion of the embodiment of FIG. 8.

FIG. 9 is a diagram of an encoder configuration 900 illustrating an alternative embodiment of the phase grating portion of the encoder configuration 800 of FIG. 8. As shown in FIG. 9, the encoder configuration 900 includes a scale element 910, a light source 930, a lens 940, two phase gratings 950A and 950B, and a beam splitter 955. A primary difference from the encoder configuration 800 of FIG. 8 is that, rather than utilizing a single phase grating 850, the encoder configuration 900 utilizes two phase gratings 950A and 950B. In one specific example embodiment, the phase grating 950A may be a 0.92 micron phase grating, while the phase grating 950B may be a 0.84 micron phase grating with air gap (no coupling). This configuration allows for a compact design, in that the phase grating 950B does not require the light beams output by the phase grating 950A to completely separate. In one specific example embodiment, after the transmission of the light through the phase gratings 950A and 950B, light fringes are produced with a specified period (e.g., 5 microns), which in combination with the pitch of the incremental scale track pattern TINC2 (e.g., 4 microns), produces modulated and spatially filtered fringes with a specified period (e.g., 20 microns).

FIGS. 10A and 10B are diagrams of the scale track pattern arrangements of the encoder configurations of FIGS. 1 and 3, respectively. As shown in FIG. 10A, the scale track pattern arrangement 1000A includes the absolute scale track pattern TABS1, the reference scale track pattern TREF1, and the incremental scale track pattern TINC1. As described above, the absolute scale track pattern TABS1 provides signals usable to determine an absolute position over an absolute measuring range, which, in the embodiment of FIG. 10A, are illustrated as including coded signal portions which indicate absolute positions along the scale track pattern.

For the incremental scale track pattern TINC1, the incremental pitch is illustrated as being relatively coarse (e.g., 20 microns.) In the section of the reference scale track pattern TREF1 shown in FIG. 10A, four reference mark patterns RM1A-RM1D are illustrated, and are shown to occur at specified intervals. In at least one embodiment, the reference marks may be formed as barker patterns, which may be formed according to a variety of known techniques. The reference mark patterns may also function as Vernier reference marks. As described above, the reference scale track pattern TREF1 is able to be resolved to a level that allows it to indicate a particular incremental wavelength, so that the incremental wavelength (e.g., from the incremental scale track pattern TINC1) is not ambiguous relative to an absolute mark (e.g., from the absolute scale track pattern TABS1). As shown in FIG. 10A, the scale has an overall width dimension X1, while the area covered by the scale track patterns TABS1, TREF1, and TINC1 has a width dimension X2. In one specific example embodiment, the dimension X1 is equal to 13 millimeters, while the dimension X2 is equal to 3.9 millimeters.

As shown in FIG. 10B, the scale track pattern arrangement 1000B includes the absolute scale track pattern TABS2, the reference scale track pattern TREF2, and the incremental scale track pattern TINC2. The various possible dimensions and configurations for the scale track patterns will be described in more detail below with respect to FIG. 11. In general, it will be appreciated that the scale track pattern arrangement 1000B is designed to be approximately the same size as the scale track pattern arrangement 1000A of FIG. 10A, such that the scale track pattern arrangement 1000B can be substituted into an encoder configuration that is otherwise designed for the scale track pattern arrangement 1000A. As shown in FIG. 10B, the absolute scale track pattern TABS2 provides signals usable to determine an absolute position over an absolute measuring range, and may comprise coded portions similar to those of the absolute scale track pattern TABS1 of FIG. 10A. In at least one embodiment, the absolute scale track pattern TABS2 may have a very coarse ABS resolution, on the order of the detector dimension along the X-axis.

As shown in FIG. 10B, the incremental scale track pattern TINC2 is illustrated as having a much finer pitch (e.g., 4 microns) as compared to the pitch of the incremental scale track pattern TINC1 of FIG. 10A (e.g., 20 microns). The portion of the reference scale track pattern TREF2 shown in FIG. 10B is illustrated as including a series of four reference mark patterns RM2A-RM2D. The reference mark patterns RM2A-RM2D may be formed as barker patterns, according to a variety of known techniques. The reference mark patterns may also function as Vernier reference marks. The reference scale track pattern TREF2 is designed so it can be resolved to a level that allows it to indicate a particular incremental wavelength for the incremental scale track pattern TINC2, so that the incremental wavelengths are not ambiguous relative to an absolute mark from the absolute scale track pattern TABS2. In at least one embodiment, the combination of the modulated and spatially filtered images of the reference track pattern TREF2 and the incremental track pattern TINC2 create a synthetic wavelength for which the measured synthetic phase points to the correct incremental scale track pattern cycle (e.g., a measured synthetic phase of zero may indicate a correct incremental cycle corresponding to that phase).

As an example, in the embodiment of FIG. 10B, each of the reference mark patterns RM2A-RM2D is shown to have a corresponding phase marker PHS2A-PHS2D, which indicates a point at which a perfectly aligned phase would occur for each position. In other words, in the reference scale track pattern TREF2, the reference mark patterns (e.g., patterns RM2A-RM2D) are provided at selected intervals (e.g., 0.6 millimeters). The phase of each reference mark pattern (e.g., at the center of each pattern where the phase markers PHS2A-PHS2D occur) matches (or has a constant phase offset from) the phase of the incremental scale track pattern TINC2 at the locations that are the specified distance (e.g., 0.6 millimeters) apart. The synthetic phase of the incremental scale track pattern TINC2 and the reference scale track pattern TREF2 is larger than the reference mark pattern length (i.e., is larger than the length of each of the individual barker patterns).

As described above, the reference scale track pattern TREF2 (with the reference mark patterns) is designed to produce the same kind of modulated and spatially filtered images as the incremental scale track pattern TINC2. In order to produce the modulated and spatially filtered imaging, a phase grating is utilized that has a pitch that is close to the pitch of the incremental scale track pattern TINC2 and the reference scale track pattern TREF2 (e.g., a phase grating pitch of 5 microns as compared to an incremental scale track pitch of 4 microns, and a reference scale track pitch of 4.1 microns). The resulting modulated and spatially filtered imaged fringe period from the phase grating and the incremental scale track pattern TINC2 may be relatively coarse (e.g., 20 microns) and may be slightly different than the modulated and spatially filtered imaged fringe period produced by the phase grating and reference scale track pattern TREF2 (e.g., 22.77 microns).

By making the reference scale track pattern TREF2 have a slightly different pitch (e.g., 4.1 microns) as compared to the pitch of the incremental scale track pattern TINC2, (e.g., 4.0 microns) the reference scale track pattern phase will match the incremental scale track pattern phase only at one specified point along a specified length (e.g., only matches at one point along a barker pattern length within the reference scale track pattern TREF2, as indicated by the phase markers PHS2A-PHS2D). This position where the phases match defines a particular incremental wavelength for the incremental scale track pattern TINC2.

As described above, by utilizing an incremental scale track pattern with a relatively fine pitch (e.g., 4 microns) which is imaged by structured light that is produced by a phase grating with a selected pitch (e.g., 5 microns), a modulated and spatially filtered pattern with a relatively coarse modulated image pitch (e.g., 20 microns) can be produced. It will be appreciated that in such an embodiment, a selected ratio (e.g., 5 to 1) exists between the modulated image pitch (e.g., 20 microns) and the pitch of the incremental scale track pattern (e.g., 4 microns). In selected embodiments, ratios of approximately 5 to 1 or higher (e.g., 10 to 1, 20 to 1, etc.) may be desired in order to allow a high resolution incremental scale track pattern to be utilized in an encoder configuration that was previously designed for a coarser incremental scale track pitch.

FIG. 11 is a table 1100 illustrating the parameters for various scale and detector track combinations for the encoder configuration of FIG. 3. As shown in FIG. 11, for a first implementation, the incremental scale track pattern TINC2 is indicated as having a pitch of p=4 microns, and the associated phase grating creates structured light of a fringe period S=5 microns. The imaged fringe period resulting from the modulated and spatially filtered imaging is f=20 microns. An interpolation factor (which indicates the needed level of interpolation) is K=40. The detector elements are designated as having a pitch d=15 microns. It will be appreciated that in certain embodiments, the detector element pitch may be designated as being ¼, ⅓, ⅔, or ¾ of the fringe period f. In at least one embodiment, the detector element pitch may be made to be ¾ for a 20 micron fringe (as for the detector element pitch d=15 microns in the present example).

For the reference scale track pattern TREF2 in the first implementation, the pitch of the elements within each of the barker patterns is p'=4.1 microns, while the associated phase grating creates structured light with a fringe period S=5 microns (similar to that for the incremental scale track pattern). The imaged fringe period produced by the combination of the structured light from the phase grating through the reference scale track pattern produces a modulated and spatially filtered imaged fringe period f'=22.77 microns. The interpolation factor is K=40. The pitch of the detector elements is d'=17 microns. For the combined use of the incremental and reference scale track patterns, the Vernier synthetic wavelength (f f'/(f−f')) equals 164 microns. The length of each of the barker patterns within the reference scale track pattern is L=136 microns (with 33 lines with the pitch p'=4.1 microns). It will be appreciated that in certain embodiments, the number of lines in the barker pattern may be required in order to form an adequately visible fringe (i.e., a significant enough portion of the beat frequency envelope), so that it can be properly detected as part of the modulated and spatially filtered image produced at the detector tracks. With regard to the number of detector elements in the image array per track and region, and their total length, for the incremental detector track DETINC1 there are 8 elements in each set (with a 120 micron total length), and for the reference detector track DETREF1 there are 8 elements in each set (with a 136 micron total length). The number of incremental cycles between the barker patterns is 150.

As shown in FIG. 11, for a second implementation, the incremental scale track pattern TINC2 is indicated as having a pitch of p=8 microns, and the associated phase grating creates structured light with a fringe period S=10 microns. The imaged fringe period resulting from the modulated and spatially filtered imaging is f=40 microns.

The interpolation factor is K=27.6. The detector elements are designated as having a pitch d=10 microns. In at least one embodiment, the detector element pitch may be made to be ¼ for a 40 micron fringe (as for the detector element pitch d=10 microns in the present example).

For the reference scale track pattern TREF2 in the second implementation, the pitch of the elements within each of the barker patterns is p'=8.3 microns, while the associated phase grating creates structured light with a fringe period S=10 microns (similar to that for the incremental scale track pattern). The imaged fringe period produced by the combination of the structured light from the phase grating through the reference scale track pattern produces a modulated and spatially filtered imaged fringe period f'=48.8 microns. The interpolation factor is K=27.6. The pitch of the detector elements is d'=12.2 microns. For the combined use of the incremental and reference scale track patterns, the Vernier synthetic wavelength (f f'/(f−f')) equals 221.3 microns. The length of each of the barker patterns within the reference scale track pattern is L=approximately 195 microns (with approximately 23 lines with the pitch p'=4.1 microns.) With regard to the number of detector elements in the image array per track and region and their total length, for the incremental detector track DETINC2 there are 16 elements in each set (with a 160 micron total length), and for the reference detector track DETREF2 there are 16 elements in each set (with a 195 micron total length). The number of incremental cycles between the barker patterns is 75.

Figure 12:
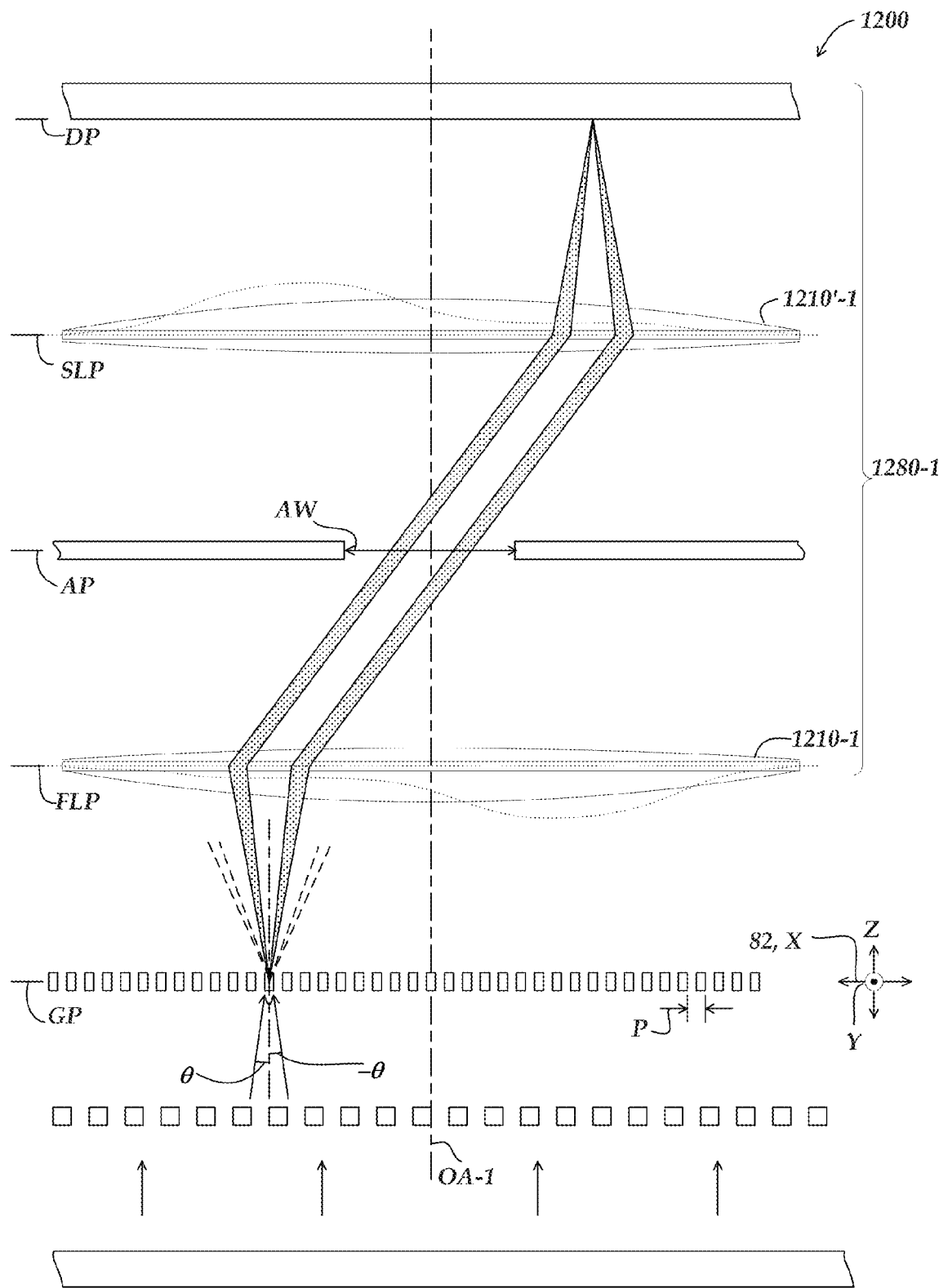
FIG. 12 shows a schematic cross section diagram showing differing optical paths through a doubly telecentric imaging encoder arrangement.

FIG. 12 is a substantial copy of a figure included U.S. patent application Ser. No. 12/535,561 (the '561 Application) which is published as U.S. Pre-Grant Publication No. US 2011/0031383 A1 (the '383 publication), and which is hereby incorporated herein by reference in its entirety. FIG. 12 may be understood based on the disclosure of the '561 Application, and will not be described in detail herein. However, the related teachings may be used in the context of the principles disclosed herein.

Briefly, FIG. 12 is a schematic cross-section diagram 1200 showing differing optical paths through an image channel 1280-1 of a doubly telecentric encoder imaging arrangement which is analogous to the doubly telecentric imaging configurations 380, 880, and 1380 shown herein. U.S. Pat. No. 7,307,789 (the '789 patent), which is hereby incorporated herein by reference, discloses various embodiments of doubly telecentric encoder configurations which utilize a second lens (or lens array) that is similar in form to a first lens (or lens array), and which is inverted relative to the first lens along an optical axis, such that lens aberrations of the two similar lenses approximately compensate one another to reduce aberrations in the resulting image. It should be appreciated that the teachings of the '789 patent address only compensating lens aberrations that cause spatial distortions in an image of a scale pattern; that is, distortion of the location of pattern features in the image. The embodiment shown in FIG. 12 may provide a similar type of correction of spatial distortions in an image when the first lens 1210-1 and second lens 1210'-1 have similar aberrations. However, a more subtle problem may occur, related to interference effects that may appear in the image due to lens aberrations. The '789 patent does not address this problem. The '561 Application does address this problem, and its teachings are applicable in various embodiments herein, especially those teachings related to diffracted order ray blocking and aperture dimensions, which may be applied with appropriate adaptations in some embodiments according to the principles disclosed herein.

Figure 13:
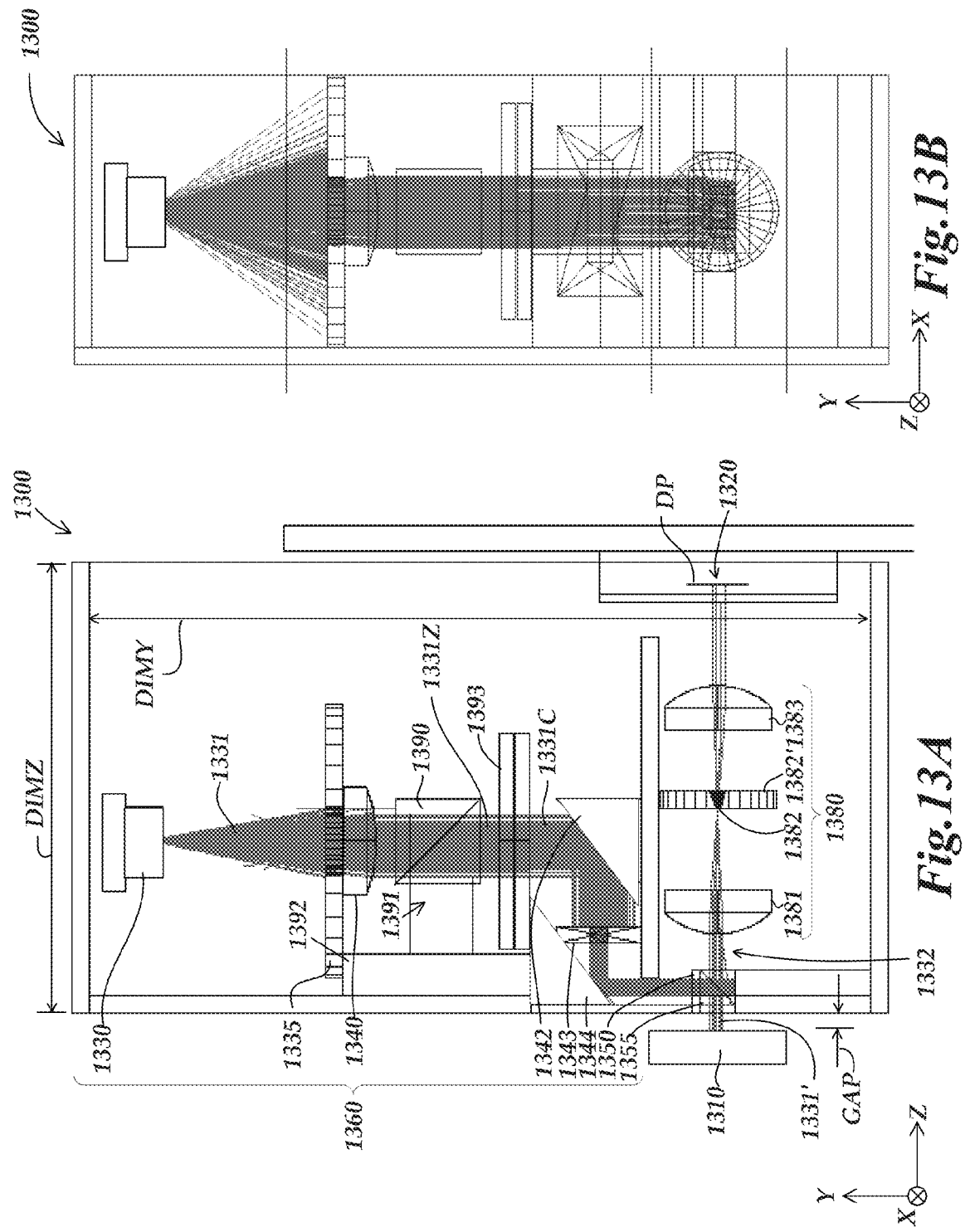
FIGS. 13A and 13B show a configuration that is another exemplary embodiment of a practical implementation of an encoder configuration according to principles disclosed herein.

FIGS. 13A and 13B show a configuration 1300 that is another exemplary embodiment of a practical implementation of the encoder configuration according to the principles disclosed herein. Certain of the components and operating principles of the encoder configuration 1300 are approximately similar to those of the encoder configuration 300 of FIG. 3 and/or 800 of FIG. 8, and may generally be understood by analogy. For example, the 13XX series numbers in FIG. 13 that have the same "XX" suffix as 3XX series numbers in FIG. 3 may designate similar or identical elements, which may function similarly, except as otherwise described or implied below or in FIGS. 13A and 13B. In at least one embodiment, the dimensional relationships of the layout shown in FIGS. 13A and 13B are shown in realistic exemplary proportions relative to one another, although such relationships may be changed in various other embodiments. In at least one embodiment, for reference, the dimension DIMZ may be approximately 26.5 mm, and the dimension DIMY may be approximately 48 mm. The dimension GAP may be approximately 1 mm. Other approximate dimensions may be scaled based on these dimensions, in one exemplary embodiment. It will be appreciated that this embodiment is exemplary only, and not limiting.

As shown in FIG. 13A, the encoder configuration 1300 includes a scale element 1310, an illumination system or portion 1360, and a doubly telecentric imaging configuration 1380. The illumination system or portion 1360 includes a light source 1330 (e.g., a laser diode, LED, or the like) for emitting visible or invisible wavelengths of light 1331 (e.g., 655 micron wavelength, for a laser, in at least one embodiment), an aperture 1335, a collimating lens 1340 (or approximately collimating, at least in the XY plane), a polarizing beam splitter 1390, a beam dump 1392, a reflector 1342, an aperture element 1345, a reflector 1344, a phase grating 1350, and a beam splitter 1355. The doubly telecentric imaging configuration 1380 comprises a first lens 1381 at a first lens plane, an aperture 1382 in an aperture component 1382' at an aperture plane, a second lens 1383 at a second lens plane, and detector electronics 1320 at a detector plane DP. The detector electronics 1320 may be connected to signal generating and processing circuitry (not shown). The light source 1330 may be connected to the signal generating and processing circuitry by power and signal connections (not shown).

In operation, light 1331 (e.g., primary light) emitted from the light source 1330 is transmitted through the aperture 1335, which may block stray portions of the light 1331. In at least one embodiment, the aperture 1335 may have a diameter of 4 mm. The transmitted light may be nearly or fully collimated by the lens 1340 and is directed through the beam splitter 1390. Z-polarized light is passed by the polarizing beam splitter 1390 as light 1331Z. The polarizing beam splitter 1390 is configured to prevent stray light from being reflected back to the light source 1330. Such stray light is reflected by the polarizing beam splitter 1390 as a beam 1391 which is directed to a beam dump 1392.

The light 1331Z passes through a quarter wave plate 1393, which converts Z-polarized incident light to R circularly polarized light 1331C. Light which may be reflected along the optical path by subsequently encountered elements returns as L circularly polarized light, and becomes X-polarized as it passes back through the quarter wave plate 1393. Such X-polarized reflected light is blocked by the polarizing beam splitter 1390, and directed to the beam dump 1392, such that it does not return to disrupt the light source 1330 or create other extraneous light rays.

The light 1331C is reflected by the reflector 1342 and directed through the aperture element 1345 which shapes the light beam 1331C such that it will illuminate a desired portion (e.g., a desired track portion) of the scale 1310 after it is reflected by the reflector 1344 and passes through the phase grating 1350 to become the diffracted structured light 1331'. In at least one embodiment, the aperture 1345 may have a X dimension of 6 mm and a Y dimension of 1.5 mm.

In at least one embodiment where the light source 1330 is a laser diode emitting 655 micron wavelength light, the scale element may have a grating pitch of 4.00 microns and the phase grating 1350 may have a grating pitch of 4.44 microns and be configured to block zero-order light. The resulting amplitude modulation may have a period of approximately 20 microns.

Then, the scale element 1310 reflects the diffracted structured light from its scale grating elements to provide the scale light 1332, which includes the previously described modulation, and is directed through the beam splitter 1355 to be imaged onto the detector 1320 by the doubly telecentric imaging configuration 1380, which may function according to previously outlined principles, to spatially filter the scale light 1332, such that the period of the amplitude modulation, which approximately matches the spatial filtering period of the detector elements of the detector 1320, is the primary intensity modulation of the scale light 1332 that finally causes the signal variation in the signals of the detector 1320. In at least one embodiment, the aperture 1382 of the doubly telecentric imaging configuration 1380 may have a diameter of approximately 1 mm, in order to block zero-order and +first-order components of the scale light 1332, and provide the desired filtering of the spatial frequency components of the scale light 1332 that have a higher spatial frequency than the amplitude modulation component. Another way of describing this is that the aperture 1382 is configured to prevent imaging of the phase grating and/or the scale grating.

Figure 14:
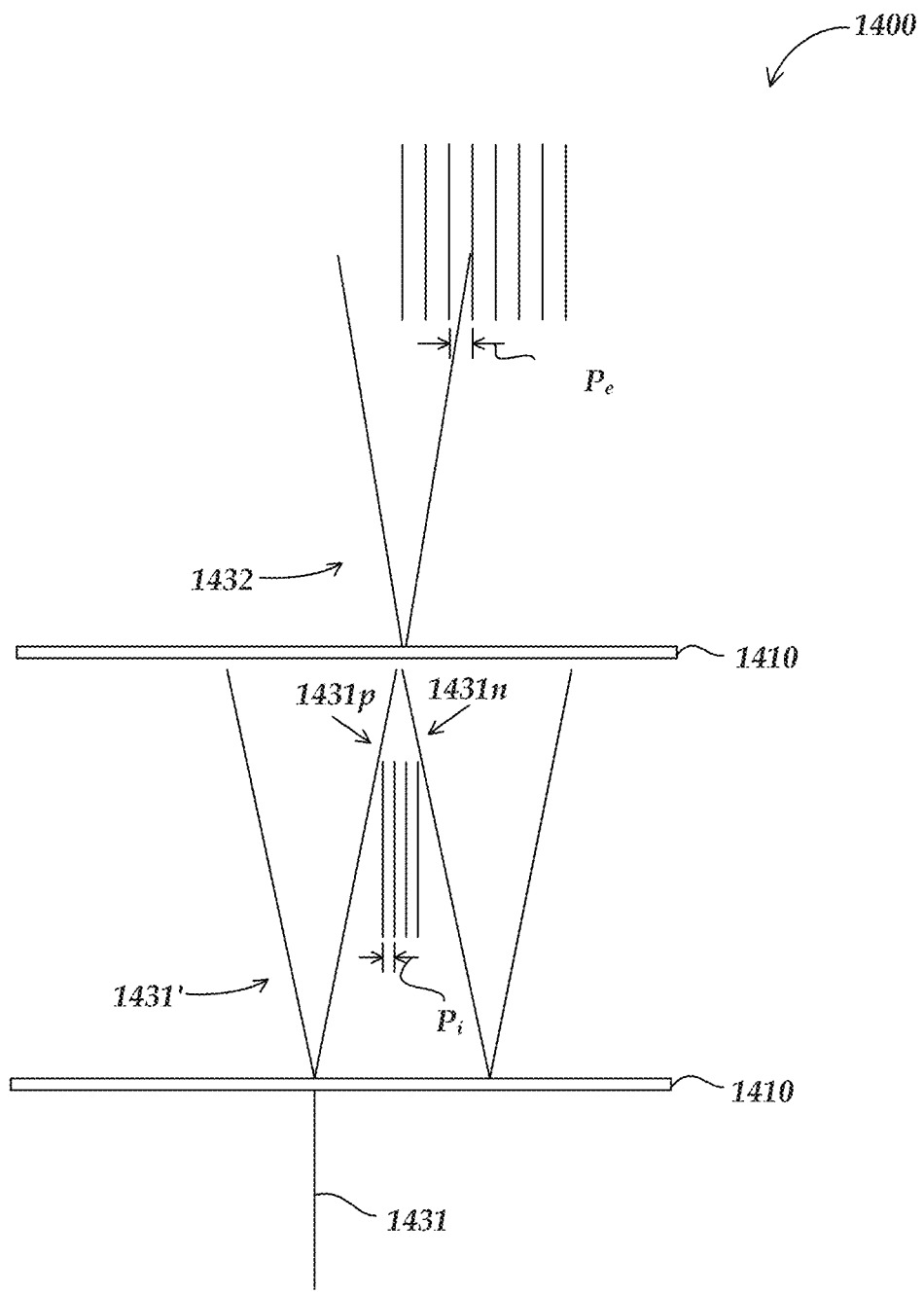
FIG. 14 shows an analysis of the configuration shown in FIG. 13, indicating how a phase grating provides the operational diffraction orders that provide the optical intensity signals on the detector.

FIG. 14 shows a reference diagram of various beam paths in an exemplary embodiment of an encoder configuration 1400 which includes a coherent light source. Certain of the components and operating principles of the encoder configuration 1400 are approximately similar to those of the encoder configuration 300 of FIG. 3 and/or 800 of FIG. 8, and may generally be understood by analogy. For example, the 14XX series numbers in FIG. 14 that have the same "XX" suffix as 3XX series numbers in FIG. 3 may designate similar or identical elements, which may function similarly, except as otherwise described or implied below or in FIG. 14. As shown in FIG. 14, the light source emits source light 1431. A phase grating 1450 splits the source light into structured illumination 1431' comprising various diffractive order ray bundles. FIG. 14 shows +1 order ray bundle 1431p and −1 order ray bundle 1431n which interfere to provide an illumination fringe pitch Pi. It should be appreciated that additional orders of ray bundles are present in the structured illumination 1431'. However, only the +1 order and −1 order are shown in FIG. 14 for the sake of simplicity. The scale 1410 comprises a scale pitch Pg. The scale 1410 receives the structured illumination 1431' and outputs scale light 1432 comprising fringes with an envelope comprising a period Pe. The period Pe may be derived in terms of the scale fringe pitch Pi and the scale pitch Pg as Pe=PgPi/(2Pi−Pg). It should be appreciated that the denominator contains a term 2Pi which is Pi in the case of incoherent light.

Figure 15:
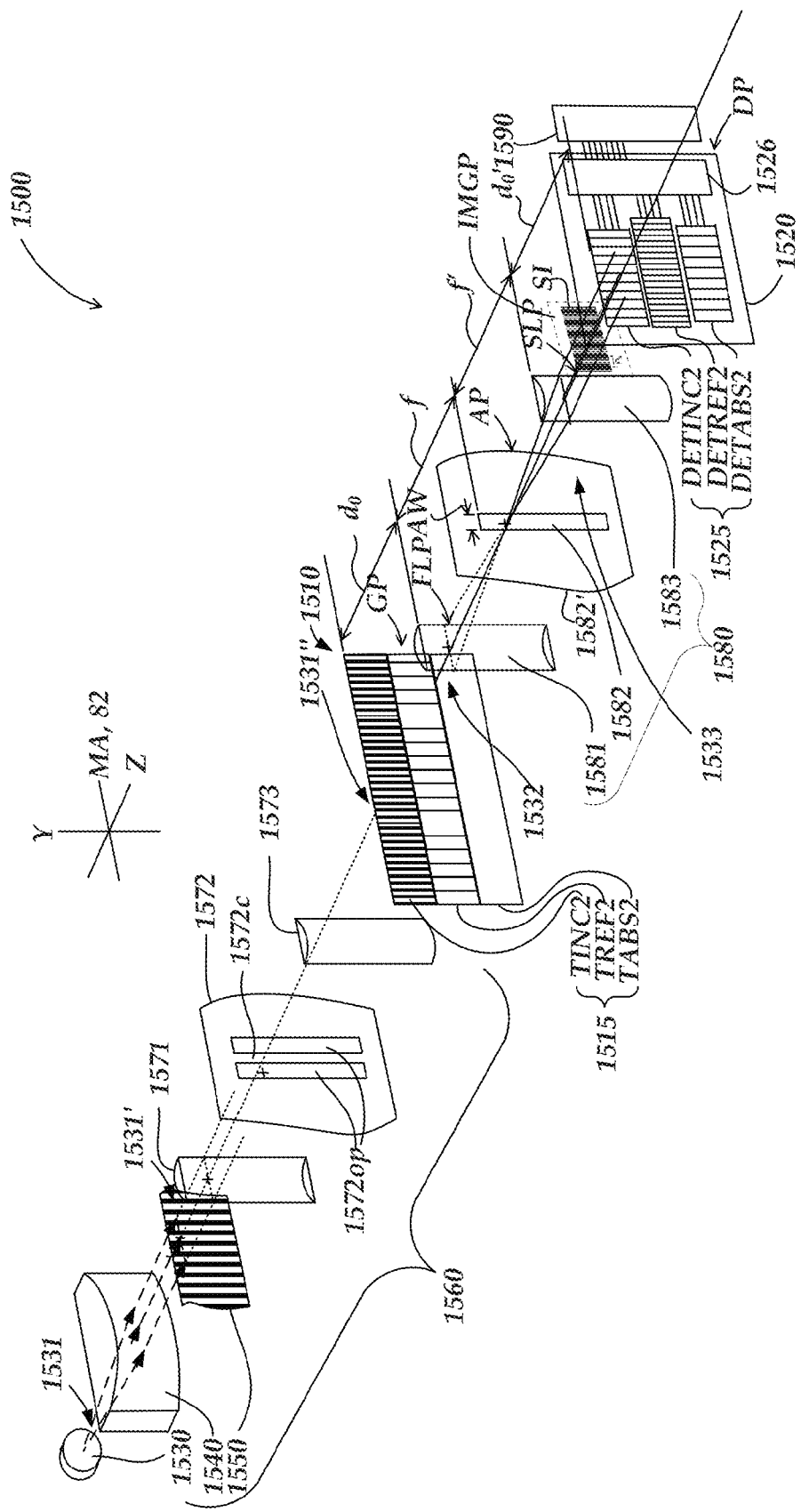
FIG. 15 is a partially schematic exploded diagram of an encoder configuration which includes a first alternative embodiment of an illumination portion.

FIG. 15 is a partially schematic exploded diagram of an encoder configuration 1500, which includes an alternative embodiment of an illumination portion 1560. With the exception of the illumination portion 1560, the components and operating principles of the encoder configuration 300 are approximately similar to those of the encoder configuration 300 of FIG. 3, and may generally be understood by analogy. For example, 15XX series numbers in FIG. 15 that have the same "XX" suffix as 3XX series numbers in FIG. 3 may designate similar or identical elements, which may function similarly, except as otherwise described or implied below.

In the embodiment shown in FIG. 15, the encoder configuration 1500 is configured such that the illumination portion 1560 (more specifically, the aperture configuration 1572) suppresses or eliminates the transmission of unwanted orders of light to the scale grating 1510 and only allows the wanted orders (e.g., only ±1 orders). This improves signal quality of the encoder configuration 1500, in comparison to previously disclosed configurations. The inventors have determined that for the encoder configurations disclosed herein, residual orders of light lead to periodic irregularities in the resulting signals at the detectors, including irregularities related to zero-order light in the structured illumination interacting with the scale grating. It has been found that such irregularities may appear in alternate periods of the signals at the detectors, rather than appearing in every period of the signal, which reduces the ability to accurately compensate and/or interpolate the resulting signals. The illumination configurations disclosed below are therefore of particular value in combination with the encoder configurations taught herein, although their utility is not limited to such configurations.

In addition to the components 1530, 1540, and 1550, the operation of which may be understood based on the previous description of analogous components, the illumination portion 1560 further comprises a first filtering lens 1571, a spatial filtering aperture configuration 1572 positioned approximately at a focal plane of the first filtering lens 1571, a second filtering lens 1573 positioned at a plane which is located approximately at a distance equal to its focal length from the spatial filtering aperture configuration 1572. In operation, the illumination grating 1550 outputs diffracted structured light 1531' in a manner similar to FIG. 3. The diffracted structured light 1531' is focused by the first illumination lens 1571 at a plane of the spatial filtering aperture configuration 1572. The spatial filtering aperture configuration 1572 is configured to block zero-order diffracted light from the diffracted structured light 1531' using a central portion 1572c and to block higher order diffracted light with edges of the aperture configuration 1572, and transmit spatially filtered structured illumination 1531" which comprises only +1 and −1 order diffracted light components using an open aperture portion 1572op. In the embodiment shown in FIG. 15, the spatial filtering aperture configuration 1572 is configured with the central portion 1572c surrounded by the open aperture portion 1572op comprising symmetrically placed slits. In some alternative embodiments, a spatial filtering aperture configuration may comprise a central circular stop surrounded by an annular aperture. The second illumination lens 1573 receives the spatially filtered structured light 1531 and outputs the spatially filtered structured illumination 1531" which consists of the +1 and −1 order diffracted light components to the scale pattern 1515 at plane coinciding with the scale grating 1510. The dimensions along the measuring axis direction of the central portion 1572c and the open aperture portion 1572op may be determined by analysis or experiment, and are generally selected to block zero-order light and transmit +/−first-order diffracted light in this particular example, respectively, as outlined above.

It should be appreciated that zero-order light output from the scale grating 1510 may be suppressed or eliminated by the imaging portion 1580, or more specifically the aperture configuration limiting aperture 1582 may be configured to spatially filter zero-order light. However, in exemplary embodiments, the first filtering lens 1571 may focus light to the spatial filtering aperture configuration 1572 with an angle (e.g., 1°) about ten times larger than the angle at the limiting aperture 1582 (e.g., 0.1°). In such embodiments, the limiting aperture 1582 is much more sensitive to misalignment than the spatial filtering aperture configuration 1572. Therefore, it is more advantageous to block zero-order light within the illumination portion 1560 than in the imaging portion 1580. Furthermore, in the embodiment shown in FIG. 15, the illumination grating 1550 may be an amplitude grating (in contrast with the phase grating 350), which reduces the cost of manufacturing the encoder configuration 1500. In the embodiment shown in FIG. 3, the encoder configuration 300 has a practical limit on how far the scale pattern 315 may be placed from the phase grating 350. If the scale pattern 315 is placed too far away from the phase grating 350, then two diffractive orders (e.g., +1 and −1 orders) may not overlap and will not interfere in order to provide diffracted structured light 331'. However, the illumination portion 1560 is configured to image diffracted structured light 1531' from a plane approximately coinciding with the illumination grating 1550. This allows for a larger operating gap than the encoder configuration 300. This also allows for the illumination portion 1560 to more efficiently provide source light because the interfering orders overlap the most at the plane of the illumination grating 1550. If desired, the modulated image pitch $P_{IMESF}$ may be adjusted by selecting an appropriate combination of the first filtering lens 1571 and the second filtering lens 1573 with focal lengths selected to give a desired pitch $P_{MI}$ of the illuminated fringe pitch pattern IFP. Compared to the configuration disclosed in U.S. patent application Ser. No. 13/717,586, this provides an extra degree of design freedom for configuring the encoder 1500 such that the resulting modulated image pitch of the spatially filtered pattern matches the pitch of a predetermined given detector. The modulated image pitch $P_{MI}$ may be chosen, for example, to provide desired relationships between the scale pitch $P_{SF}$ and the modulated image pitch $P_{IMESF}$ according to principles outlined in FIGS. 4A-4D.

Figure 16:
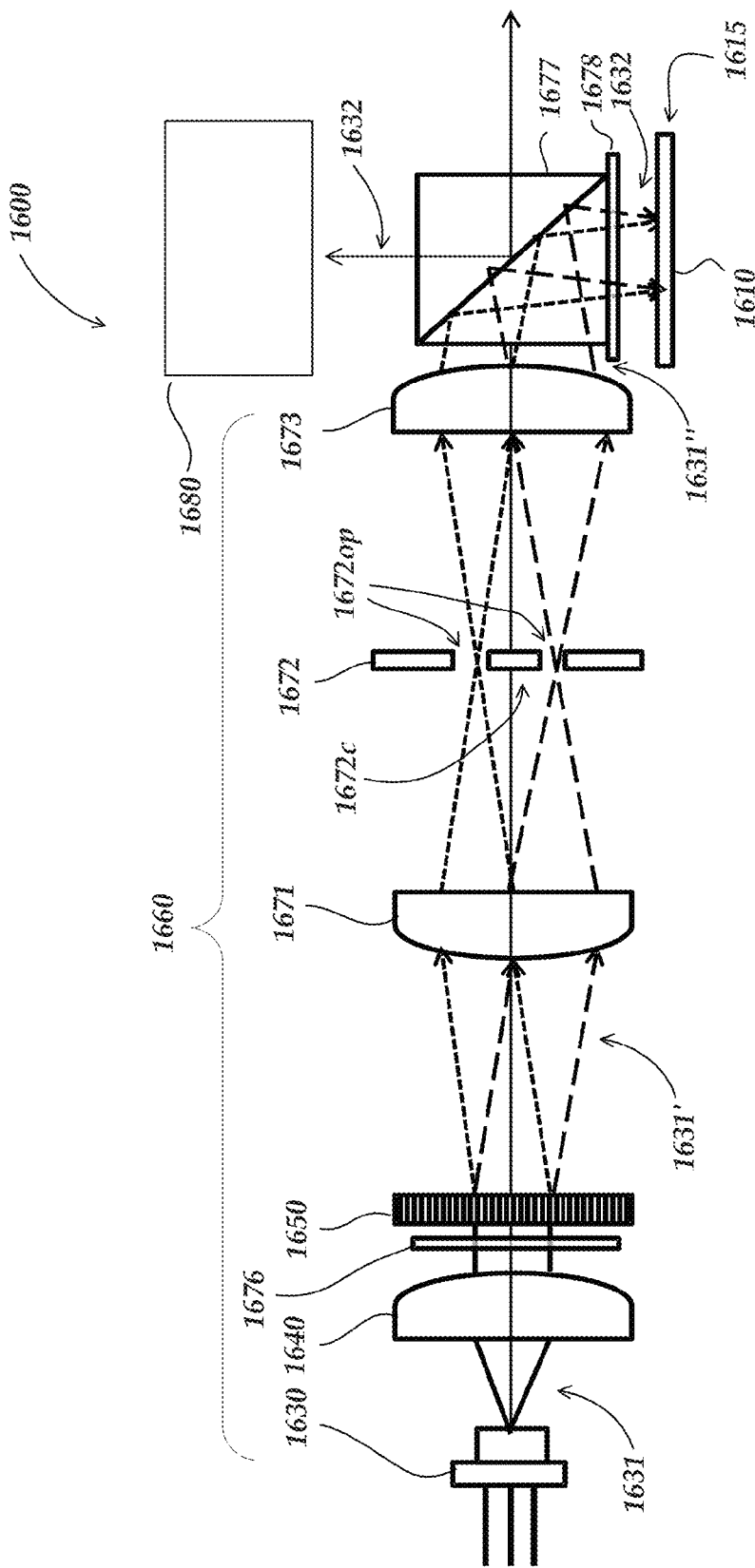
FIG. 16 is a schematic drawing of an encoder configuration which includes a second alternative embodiment of an illumination portion which includes elements in addition to those shown in FIG. 15, and which may be used in a reflective encoder configuration.

FIG. 16 is a drawing of an illumination portion 1660 which may be used in a reflective encoder configuration 1600 according to the principles disclosed herein. The components and operating principles of the encoder configuration 1600 are approximately similar to those of the encoder configuration 1500 of FIG. 15, and may generally be understood by analogy. For example, 16XX series numbers in FIG. 16 that have the same "XX" suffix as 15XX series numbers in FIG. 15 may designate similar or identical elements, which may function similarly, except as otherwise described or implied below. In the embodiment shown in FIG. 16, the illumination portion 1660 additionally comprises a polarizer 1676, a polarizing beam splitter 1677, and a quarter wave plate 1678. In contrast with the encoder configuration 1500 which is a transmissive configuration, the encoder configuration 1600 is a reflective configuration. The transmissive configuration 1500 may be readily adapted to a reflective configuration analogous to that described with reference to FIG. 16, or by analogy with other reflective configurations disclosed herein. However, the addition of polarizers according to the principles taught with reference to FIG. 16 provides a more efficient use of light, as described in greater detail below. Such a use of polarizers may be adapted for use in conjunction with any compatible embodiment described herein.

In operation, the polarizer 1676 inputs coherent collimated light 1631 from a lens 1640 and outputs collimated light which is linearly polarized. The polarizing beam splitter 1677 reflects spatially filtered structured illumination 1631" from the second filtering lens 1673 to the quarter wave plate 1678. The quarter wave plate 1678 circularly polarizes the spatially filtered structured illumination 1631" from the second filtering lens 1673 and outputs it to the scale pattern 1615. The scale pattern 1615 reflects spatially modulated image light 1632 with a circular polarization to the quarter wave plate 1678. The quarter wave plate 1678 inputs the spatially modulated image light 1632 with a circular polarization and outputs the spatially modulated image light 1632 to the polarizing beam splitter 1677 with a linear polarization which is rotated 90 degrees with respect to the structured illumination 1631" input from the second filtering lens 1673. The polarizing beam splitter 1677 transmits the spatially modulated image light 1632 with a linear polarization to the imaging portion 1680. Because the quarter wave plate 1678 returns spatially modulated image light 1632 to the polarizing beams splitter 1677 with a polarization rotated by 90 degrees (thus matching the polarization direction to transmit through the beam splitter 1677), this increases the amount of light output to the imaging portion 1680 by a factor of four compared to a configuration lacking the quarter wave plate 1678.

While various embodiments have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An illumination portion of an optical encoder which comprises a scale grating, an imaging portion, and a detector portion, the illumination portion comprising:
   a light source configured to output light having a wavelength λ;
   a structured illumination generating portion configured to input the light and output structured illumination wherein the structured illumination comprises an illumination fringe pattern oriented transversely to the measuring axis direction;
   a first filtering lens;
   a spatial filtering aperture configuration; and
   a second filtering lens, wherein:
   the first filtering lens is configured to focus the structured illumination proximate to a plane of the spatial filter aperture configuration;
   the spatial filtering aperture configuration includes a central portion that is configured to block zero and higher-order light included in the structured illumination and an open aperture portion proximate to the central portion that is configured to output +1 order and −1 order portions of the structured illumination to the second filtering lens; and
   the second filtering lens is configured to output the structured illumination to a plane of the scale grating as filtered structured illumination with an illumination fringe pitch $P_{MI}$ along the measuring axis direction at a plane coinciding with the scale grating.

2. The illumination portion of claim 1, wherein the structured illumination generating portion comprises an illumination grating positioned between the light source and the first filtering lens and configured to output diffracted light to the first filtering lens.

3. The illumination portion of claim 1, further comprising a lens positioned between the light source and the first filtering lens which is configured to collimate the light output by the light source.

4. The illumination portion of claim 1, further comprising:
   a linear polarizer configured to input coherent, collimated light from the light source and output light which is linearly polarized;
   a polarizing beam splitter configured to reflect spatially filtered structured illumination from the second filtering lens to a quarter wave plate;
   wherein:
   the quarter wave plate is configured to circularly polarize the light from the second filtering lens and output it to the scale grating;
   the scale pattern is configured to reflect spatially modulated image light with a circular polarization;
   the quarter wave plate is configured to input the spatially modulated image light with a circular polarization and output linearly polarized, spatially modulated image light with a linear polarization to the polarizing beam splitter; and
   the polarizing beam splitter is configured to transmit the spatially modulated image light with a linear polarization to the imaging portion.

5. The illumination portion of claim 4, further comprising an illumination grating positioned between the light source and the first filtering lens and configured to output diffracted light to the first filtering lens.

6. The illumination portion of claim 5, wherein the illumination grating is an amplitude grating.

7. The illumination portion of claim 1, wherein:
   the first filtering lens comprises a focal length F1, the second filtering lens comprises a focal length F2, the second lens positioned between the spatial filtering aperture configuration and the detector portion at the focal length F2 from the spatial filtering aperture configuration and configured to receive light from the spatial filtering aperture configuration and form an operable periodic image; and the illumination portion comprises a magnification M of the illumination fringe pitch $P_{MI}$ along the measuring axis direction, wherein M is approximately M=F1/F2, and is set solely by selecting the distances F1 and F2.

8. The illumination portion of claim 1, wherein:

the scale grating comprises a scale pitch $P_{SF}$;

the detector portion comprises a set of respective optical detectors positioned to respectively receive different phases of an operable periodic image, the set of respective optical detectors having a detector pitch Pd along the measuring axis direction, the detector pitch Pd corresponding to a pitch between detector elements corresponding to a particular detector signal phase;

the scale grating is configured to input the structured illumination and output the spatially modulated image light comprising the structured illumination modulated by an intensity modulation envelope that has a spatial wavelength $P_{IMESF}$ that depends on the scale pitch $P_{SF}$ and the illumination fringe pitch $P_{MI}$; and the illumination fringe pitch $P_{MI}$ is configured to be selected such that it satisfies the relationship $\Delta n P_{MI} P_{SF}/(\Delta n P_{MI} - P_{SF}) = P_{IMESF} = m*Pd/k$ when the light source outputs incoherent light and $\Delta n P_{MI} P_{SF}/(2\Delta n P_{MI} - P_{SF}) = P_{IMESF} = m*Pd/k$ when the light source outputs coherent light, where m is a number of phase signals output by the detector portion and k is an odd integer.

* * * * *